United States Patent
Satou et al.

(10) Patent No.: US 10,602,419 B1
(45) Date of Patent: Mar. 24, 2020

(54) TERMINAL DEVICE, COMMUNICATION SYSTEM AND COMMUNICATION QUALITY MEASUREMENT METHOD

(71) Applicant: PANASONIC CORPORATION, Osaka (JP)

(72) Inventors: Tetsurou Satou, Kanagawa (JP); Hiroaki Asano, Kanagawa (JP); Hideki Shingu, Tokyo (JP); Noriyuki Shimizu, Kanagawa (JP); Masaaki Yoshino, Kanagawa (JP)

(73) Assignee: PANASONIC CORPORATION, Osaka (JP)

(*) Notice: Subject to any disclaimer, the term of this patent is extended or adjusted under 35 U.S.C. 154(b) by 0 days.

(21) Appl. No.: 16/603,122

(22) PCT Filed: Dec. 13, 2017

(86) PCT No.: PCT/JP2017/044698
§ 371 (c)(1),
(2) Date: Oct. 4, 2019

(87) PCT Pub. No.: WO2018/185975
PCT Pub. Date: Oct. 11, 2018

(30) Foreign Application Priority Data

Apr. 7, 2017 (JP) .................................. 2017-076923

(51) Int. Cl.
*H04W 36/00* (2009.01)
*H04W 36/30* (2009.01)
(Continued)

(52) U.S. Cl.
CPC ........... *H04W 36/30* (2013.01); *H04W 24/08* (2013.01); *H04W 24/10* (2013.01); *H04W 36/04* (2013.01); *H04W 36/32* (2013.01)

(58) Field of Classification Search
CPC ..... H04W 36/30; H04W 24/08; H04W 24/10; H04W 36/04; H04W 36/32; H04W 4/00;
(Continued)

(56) References Cited

U.S. PATENT DOCUMENTS

2006/0258386 A1* 11/2006 Jeong .................... H04W 36/24
455/525
2007/0042799 A1* 2/2007 Jubin .................... H04W 52/04
455/522
(Continued)

FOREIGN PATENT DOCUMENTS

JP 2015-159585 9/2015
JP 2016-116085 6/2016
(Continued)

OTHER PUBLICATIONS

International Search Report (ISR) from International Searching Authority (Japan Patent Office) in International Pat. Appl. No. PCT/JP2017/044698, dated Mar. 6, 2018.

*Primary Examiner* — Mahendra R Patel
(74) *Attorney, Agent, or Firm* — Greenblum & Bernstein, P.L.C.

(57) ABSTRACT

To shorten time required to measure communication quality levels, a terminal device selects one of a or second measurement scheme based on an amount of available bandwidth provided by a current cell in which the terminal device is currently present and other information. When the current cell is provides a largest amount of available bandwidth, the terminal device selects the first scheme, and when the current cell provides a smallest amount of available bandwidth, the terminal device selects the second scheme. When the first scheme is selected, the terminal device measures communication quality levels of communication with all peripheral cells, and when the second scheme is selected, the terminal device acquires current location information on the
(Continued)

terminal device, and then extracts one or more of the peripheral cells based on current location information and historical communication information, and measures communication quality levels of communication with the extracted peripheral cells.

13 Claims, 19 Drawing Sheets

(51) Int. Cl.
    *H04W 24/08*      (2009.01)
    *H04W 36/04*      (2009.01)
    *H04W 36/32*      (2009.01)
    *H04W 24/10*      (2009.01)

(58) Field of Classification Search
    CPC ..... H04W 24/02; H04W 16/08; H04W 52/02; H04W 64/00; H04W 72/04; H04W 16/32; H04W 48/16; H04W 52/0225; H04B 1/38; H04B 17/00; H04Q 7/20; H04Q 7/30; H04L 12/56; H04L 12/28
    USPC .................. 455/436, 418, 525; 370/332, 331
    See application file for complete search history.

(56) References Cited

U.S. PATENT DOCUMENTS

| | | | |
|---|---|---|---|
| 2007/0105583 A1* | 5/2007 | Gerlach | H04W 16/04 455/522 |
| 2009/0046641 A1* | 2/2009 | Wang | H04W 74/002 370/329 |
| 2009/0252113 A1* | 10/2009 | Take | H04W 36/30 370/331 |
| 2009/0274123 A1* | 11/2009 | Chang | H04W 24/10 370/332 |
| 2010/0087194 A1* | 4/2010 | MacNaughtan | H04W 64/00 455/435.2 |
| 2010/0322079 A1* | 12/2010 | Kitazoe | H04W 36/0088 370/241 |
| 2012/0088491 A1* | 4/2012 | Deng | H04W 24/02 455/418 |
| 2017/0325165 A1* | 11/2017 | Kato | H04W 16/32 |

FOREIGN PATENT DOCUMENTS

| | | | | |
|---|---|---|---|---|
| JP | 2017-017454 | | 1/2017 | |
| WO | WO-2007057977 A1 | * | 5/2007 | ............ H04W 36/30 |

* cited by examiner

Fig.5
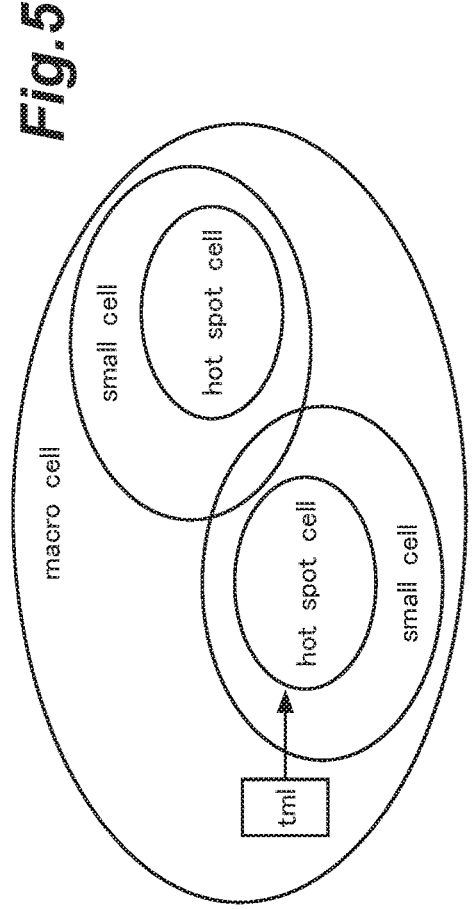
(A-1)
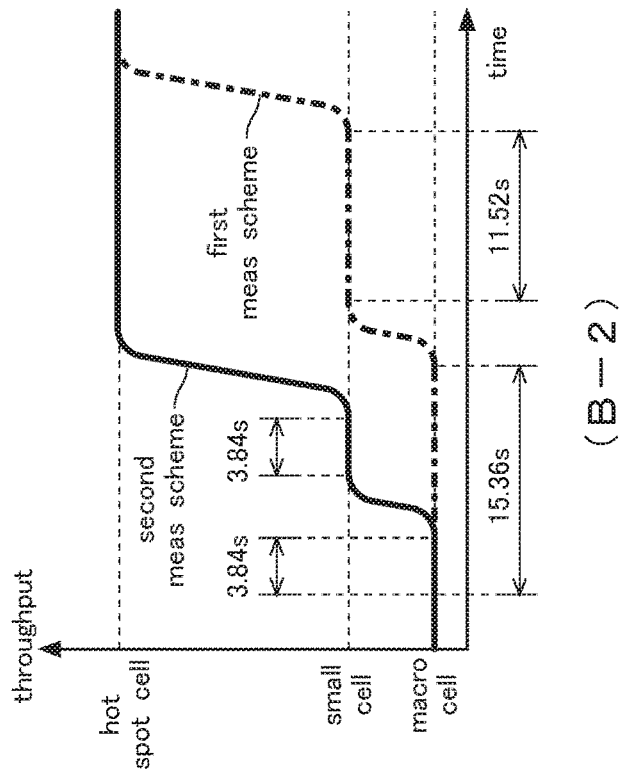
(B-1)
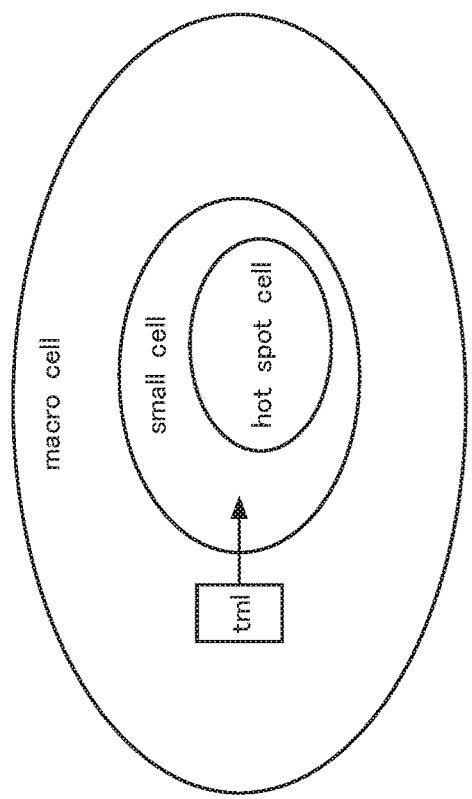
(A-2)
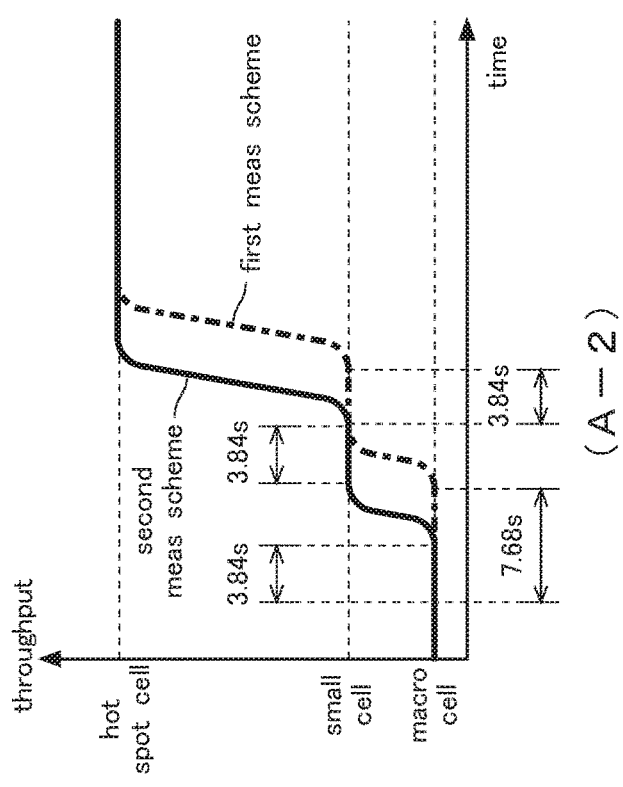
(B-2)

Fig.6
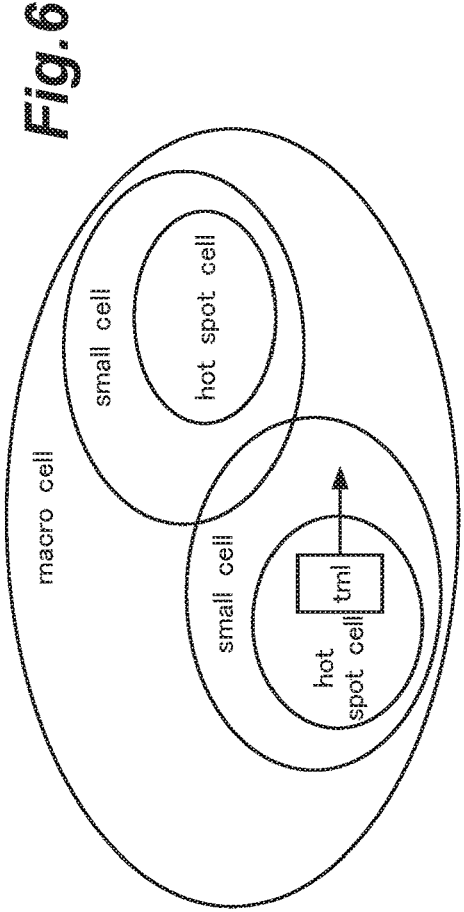
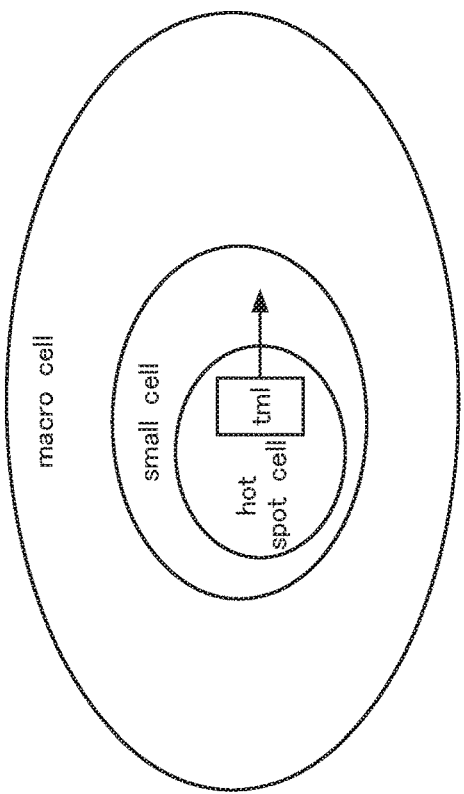
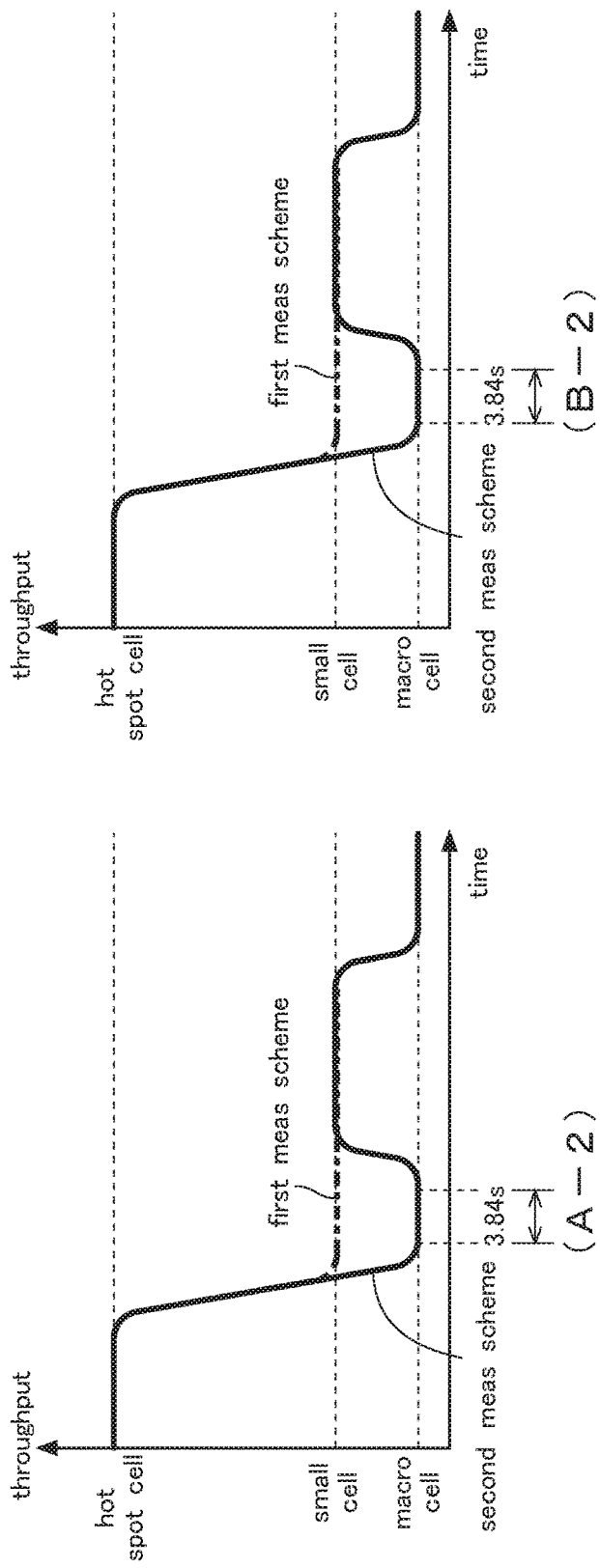

Fig.8

| location | connection destination information ||| communication quality information |||
| --- | --- | --- | --- | --- | --- | --- |
| | cnx dest indentfier | frequency | comm scheme | received power[dBm] | throughput [Mbps] | comm. data volume[MB] |
| ... | 101 | F0 | RAT1 | −90 | 20 | 50 |
| ... | 101 | F0 | RAT1 | −85 | 30 | 100 |
| ... | 103 | F1 | RAT2 | −75 | 100 | 500 |
| ... | 102 | F2 | RAT3 | −70 | 600 | 1000 |
| ⋮ | ⋮ | ⋮ | ⋮ | ⋮ | ⋮ | ⋮ |

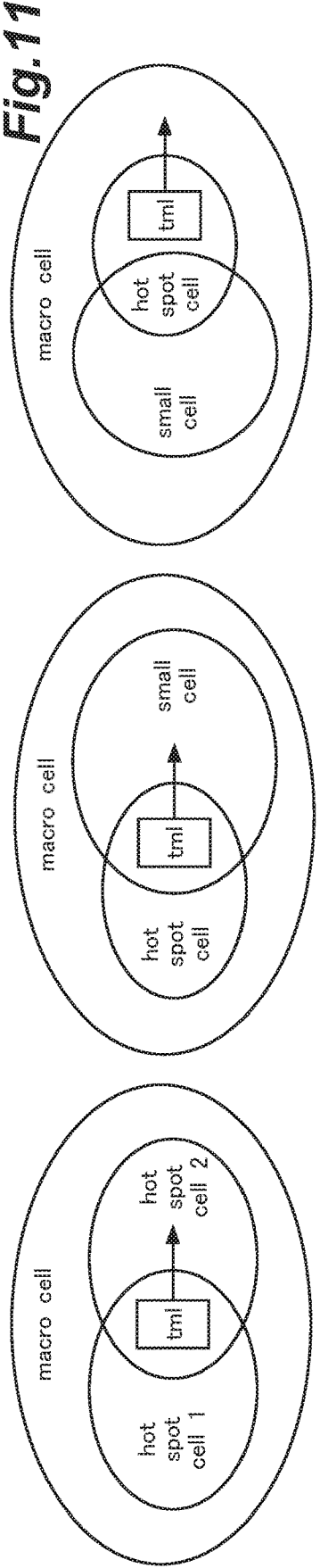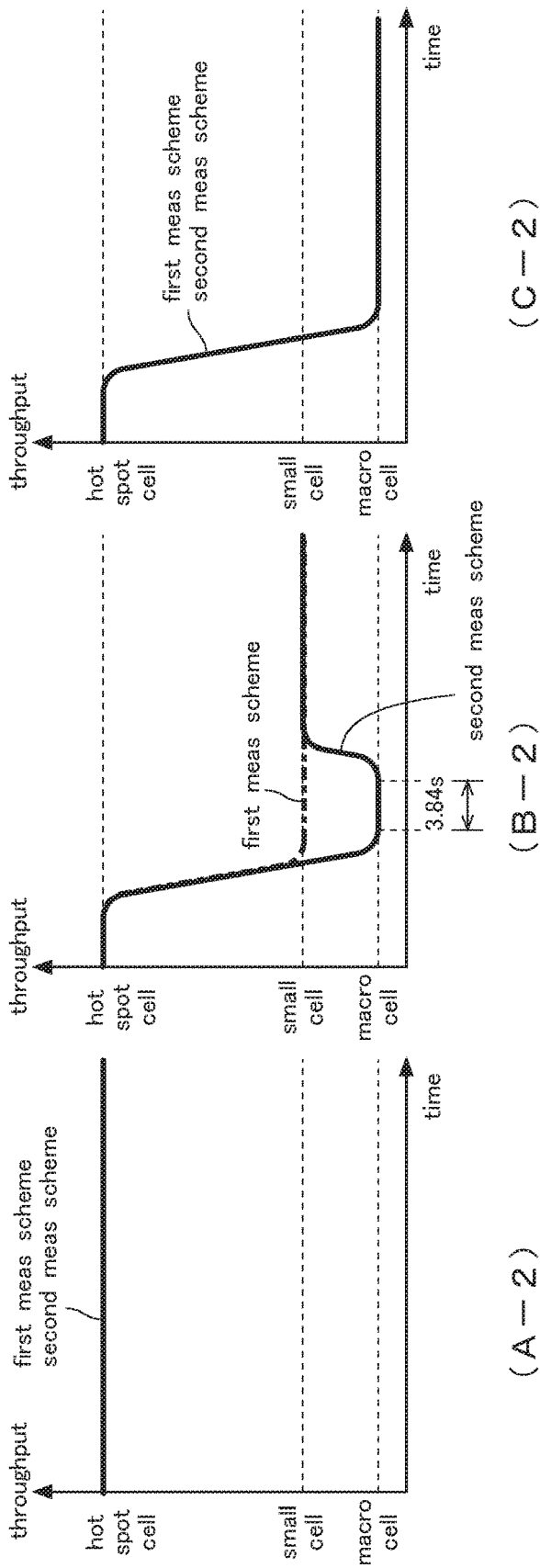
Fig. 11

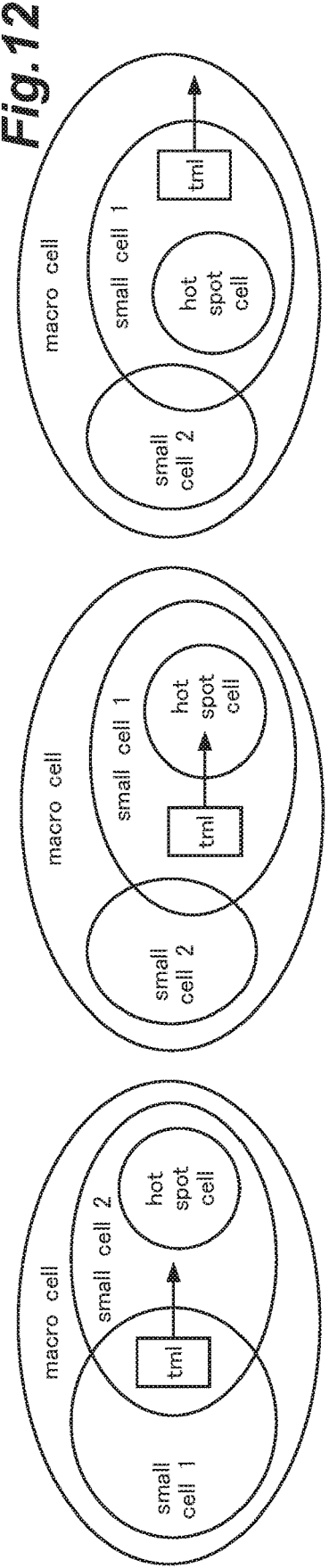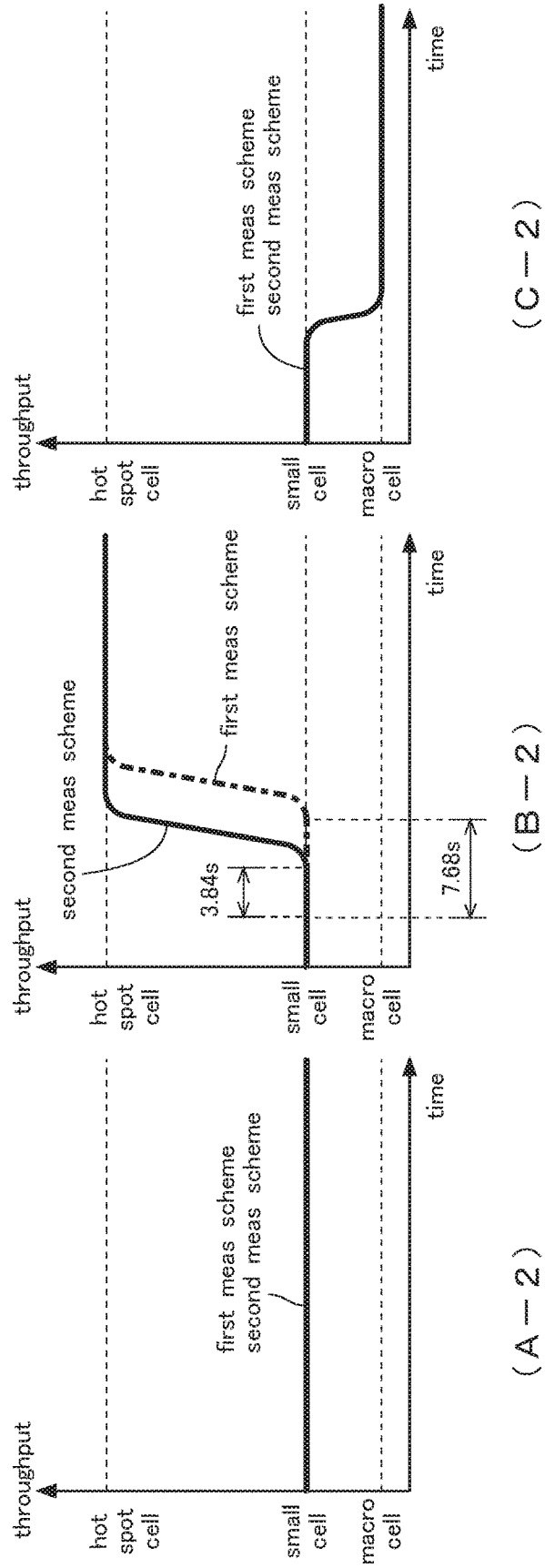
Fig.12

Fig. 13
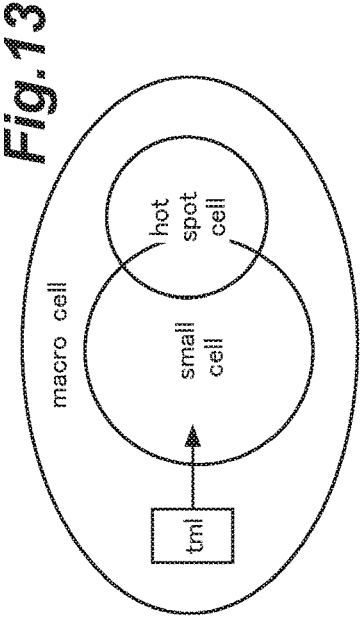
(A-1)
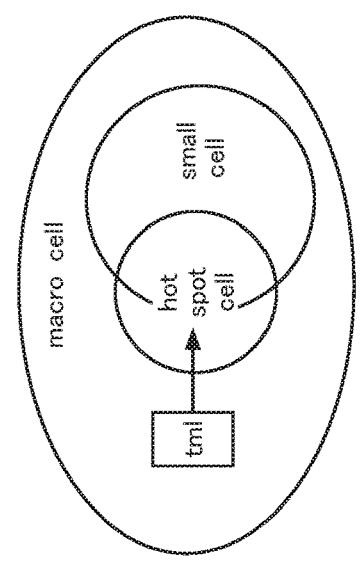
(B-1)
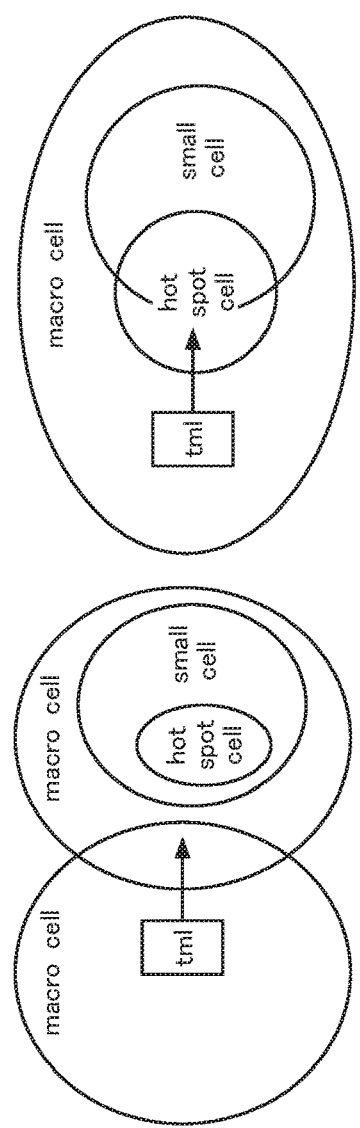
(C-1)
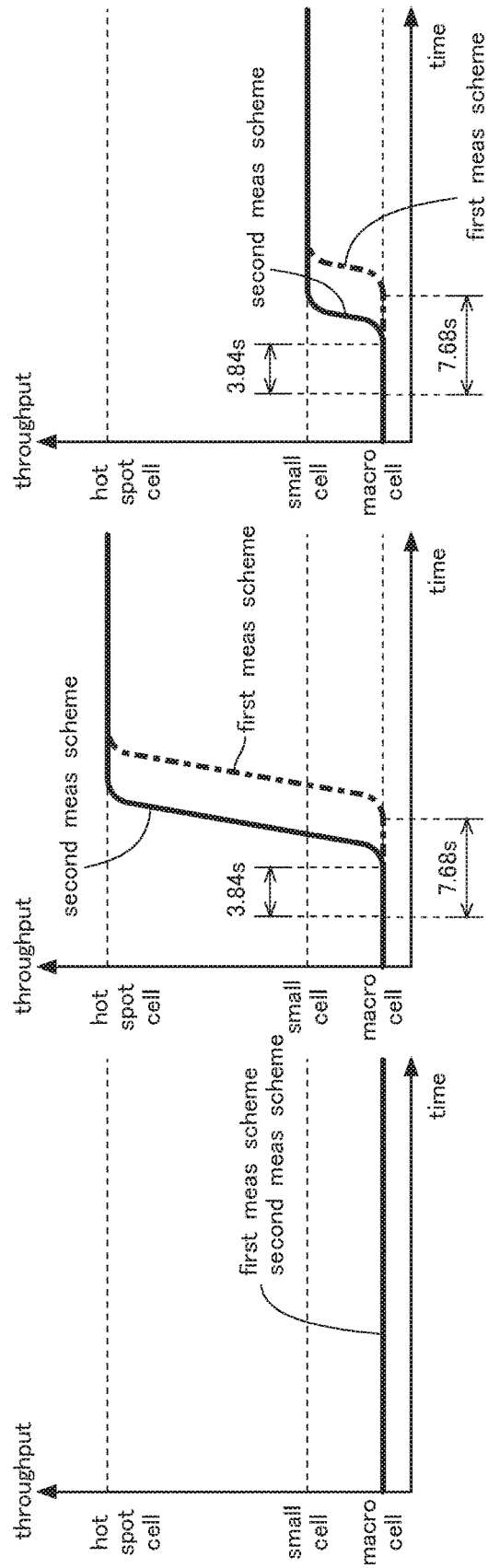

Fig.14

|  |  | new cell | | |
|---|---|---|---|---|
|  |  | hot spot cell | small cell | macro cell |
| current cell | hot spot cell | no preference | first meas scheme more advantageous | no preference |
|  | small cell | second meas scheme more advantageous | no preference | no preference |
|  | macro cell | second meas scheme more advantageous | second meas scheme more advantageous | no preference |

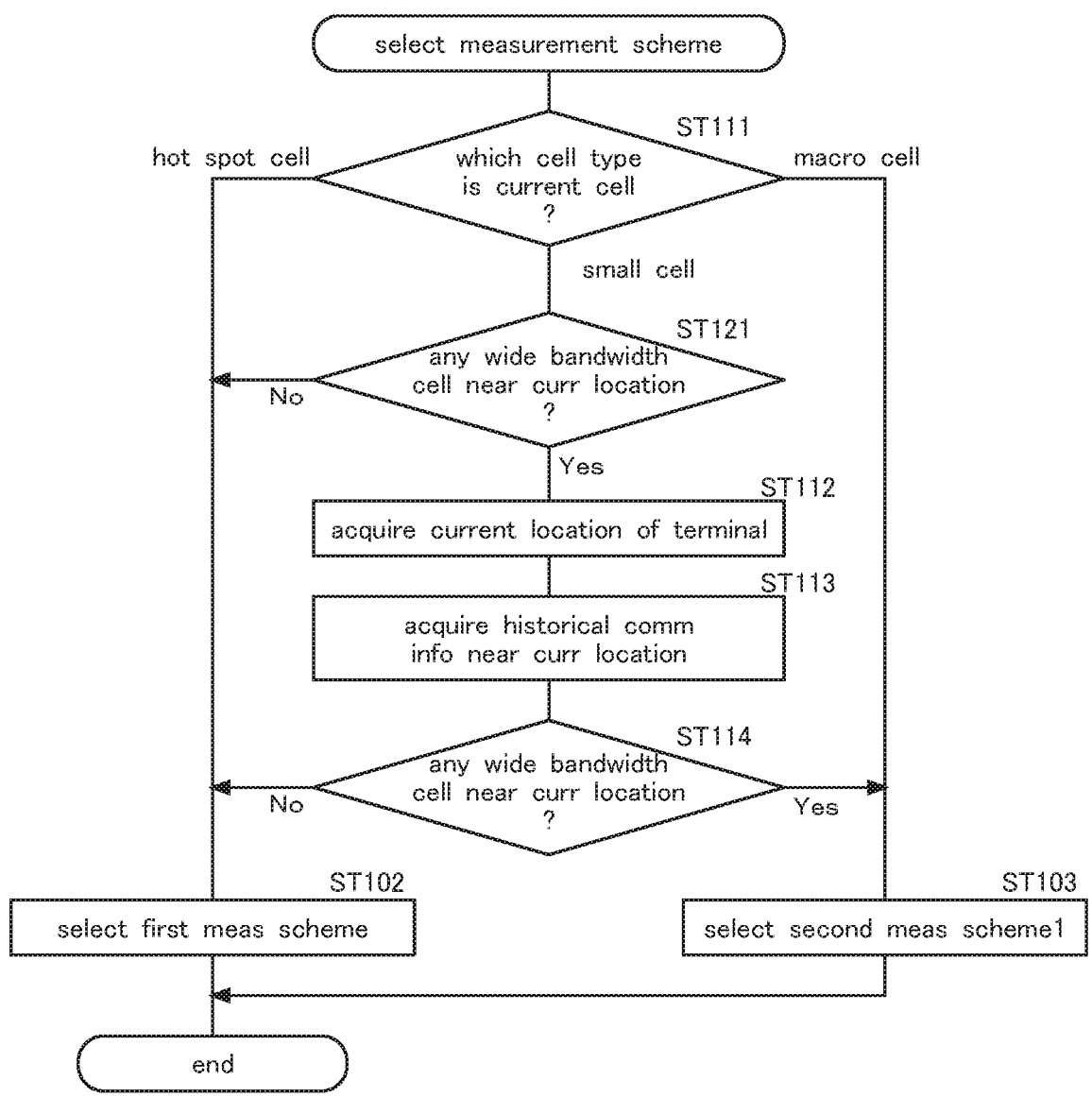

TERMINAL DEVICE, COMMUNICATION SYSTEM AND COMMUNICATION QUALITY MEASUREMENT METHOD

TECHNICAL FIELD

The present invention relates to a terminal device, a communication system, and a communication quality measurement method for measuring quality levels of communication with peripheral cells notified by a communication control device and reporting measurement results to the communication control device.

BACKGROUND ART

In recent years, various wireless communication schemes such as LTE (Long Term Evolution) have been widely used. Studies have been proceeding with advanced considerations in relation to 5G systems (next generation mobile communication systems). In 5G systems, wireless communication systems utilizing high frequency bands such as low SHF band and high SHF band will be added to usable frequency bands, which will expand a range of choices of connection destinations for a terminal device. In such systems, a terminal device performs a connection destination search operation (cell search operation) to extract an optimal connection destination, and such a connection destination search operation involves measuring a communication quality level of communication with each connection destination. When a terminal device has an increased number of choices of connection destinations, it takes a longer time to perform a communication quality measurement operation. One possible approach to shortening a time required to perform the communication quality measurement operation is to narrow down a scope of targets of communication quality measurement.

Known technologies involving narrowing down a scope of targets of communication quality measurement include a method in which a base station handling control plane messages (a macro cell base station) extracts base stations as connection destination candidates based on information on locations of terminals or other information, and determines candidates of radio frequencies to be assigned for communication based on information on amounts of data communicated in the past using respective radio frequencies, the information being stored in a utilization history database. (See Patent Document 1)

PRIOR ART DOCUMENT (S)

Patent Document(S)

Patent Document 1: JP2016-116085A

SUMMARY OF THE INVENTION

Task to be Accomplished by the Invention

In the above-described technology, a C-plane base station for handling control plane messages narrows down a scope of connection destination candidates before notifying terminals of designated connection destination candidates, thereby restricting targets of communication quality measurement so as to shorten a time required to perform a communication quality measurement operation. However, this technology of the prior art involves a problem that, as a range of selectable connection destinations is expanded and/or the number of terminals is increased, a processing load of the C-plane base station becomes higher.

The present invention has been made in view of such problems of the prior art, and a primary object of the present invention is to provide a terminal device, a communication system, and a communication quality measurement method, which enables a terminal device to narrow down a scope of targets of communication quality measurement to thereby shorten a time required to perform a communication quality measurement operation.

Means to Accomplish the Task

An aspect of the present invention provides a terminal device configured to measure communication quality levels of communication with peripheral cells notified by a communication control device, and report measurement results to the communication control device, the terminal device comprising: a communication device configured to communicate with the communication control device; a location information acquisition device configured to acquire current location information indicating a current location of the terminal device; an information storage configured to accumulate historical communication information on past communication status at respective locations; and a controller configured to, upon receiving information on the peripheral cells from the communication control device, measure communication quality levels of communication with the peripheral cells, and transmit measurement results to the communication control device; wherein the controller is configured such that, after determining a current cell in which the terminal device is currently present, when the current cell is a cell providing a largest amount of available bandwidth, the controller selects a first measurement scheme, whereas, when the current cell is a cell providing a smallest amount of available bandwidth, the controller selects a second measurement scheme, and wherein, when the controller selects the first measurement scheme, the controller measures communication quality levels of communication with all the notified peripheral cells, whereas, when the controller selects the second measurement scheme, after the location information acquisition device acquires the current location information, and then, based on the current location information and the historical communication information, the controller extracts one or more of the notified peripheral cells and measures communication quality levels of communication with the extracted one or more peripheral cells.

Another aspect of the present invention provides a communication system in which a communication control device notifies a terminal device of peripheral cells, and the terminal device, in turn, measures communication quality levels of communication with the peripheral cells, and reports measurement results to the communication control device, wherein the terminal device comprises: a communication device configured to communicate with the communication control device; a location information acquisition device configured to acquire current location information indicating a current location of the terminal device; an information storage configured to accumulate historical communication information on past communication status at respective locations; and a controller configured to, upon receiving information on the peripheral cells from the communication control device, measure communication quality levels of communication with the peripheral cells, and transmit measurement results to the communication control device, and wherein the controller is configured such that, after determining a current cell in which the terminal device is currently present, when the current cell is a cell providing a largest amount of available bandwidth, the controller selects a first measurement scheme, whereas, when the current cell is a cell providing a smallest amount of available bandwidth, the controller selects a second measurement scheme, and wherein, when the controller selects the first measurement scheme, the controller measures communication quality levels of communication with all the notified peripheral cells, whereas, when the controller selects the second measurement scheme, after the location information acquisition device acquires the current location information, and then, based on the current location information and the historical communication information, the controller extracts one or more of the notified peripheral cells and measures communication quality levels of communication with the extracted one or more peripheral cells.

Yet another aspect of the present invention provides a communication quality measurement method performed by a terminal device for measuring communication quality levels of communication with peripheral cells notified by a communication control device and reporting measurement results to the communication control device, the method comprising: upon the terminal device receiving information on the peripheral cells, when a current cell in which the terminal device is present is a cell providing a largest amount of available bandwidth, the terminal device selecting a first measurement scheme, and when the current cell is a cell providing a smallest amount of available bandwidth, the terminal device selecting a second measurement scheme; when the first measurement scheme is selected, the terminal device measuring communication quality levels of communication with all the peripheral cells, and when the second measurement scheme is selected, the terminal device acquiring current location information, and then, based on the current location information and historical communication information, which is information on past communication status at respective locations, the terminal device extracting one or more of the peripheral cells and measures communication quality levels of communication with the extracted one or more peripheral cells; and the terminal device transmitting the measurement results to the communication controller.

Effect of the Invention

According to the present invention, by selecting the second measurement scheme, a terminal device can narrow down a scope of targets of communication quality measurement to thereby shorten a time required to perform a measurement operation. Moreover, by switching between the first measurement scheme and the second measurement scheme depending on circumstances, a terminal, which is currently using the second measurement scheme, can avoid failure to properly change its connection to a new cell.

BRIEF DESCRIPTION OF THE DRAWINGS

FIG. 5 is an explanatory view showing how a terminal changes its connection to cells and how a throughput changes, with the change in measurement schemes;

FIG. 6 is an explanatory view showing how a terminal changes its connection to cells and how a throughput changes, with the change in measurement schemes;

FIG. 8 is an explanatory view showing an example of registered data in a historical database;

FIG. 11 is an explanatory view showing how a terminal changes its connection to cells and how a throughput changes, with the change in measurement schemes;

FIG. 12 is an explanatory view showing how a terminal changes its connection to cells and how a throughput changes, with the change in measurement schemes;

FIG. 13 is an explanatory view showing how a terminal changes its connection to cells and how a throughput changes, with the change in measurement schemes;

FIG. 14 is an explanatory view showing which measurement scheme is more advantageous, the first measurement scheme or the second measurement scheme, in each combination of a current cell and a destination cell;

FIG. 19 is a flowchart showing a processing operation procedure of a measurement scheme selector 22 according to a sixth embodiment of the present invention.

DESCRIPTION OF THE PREFERRED EMBODIMENT(S)

Figure 1:
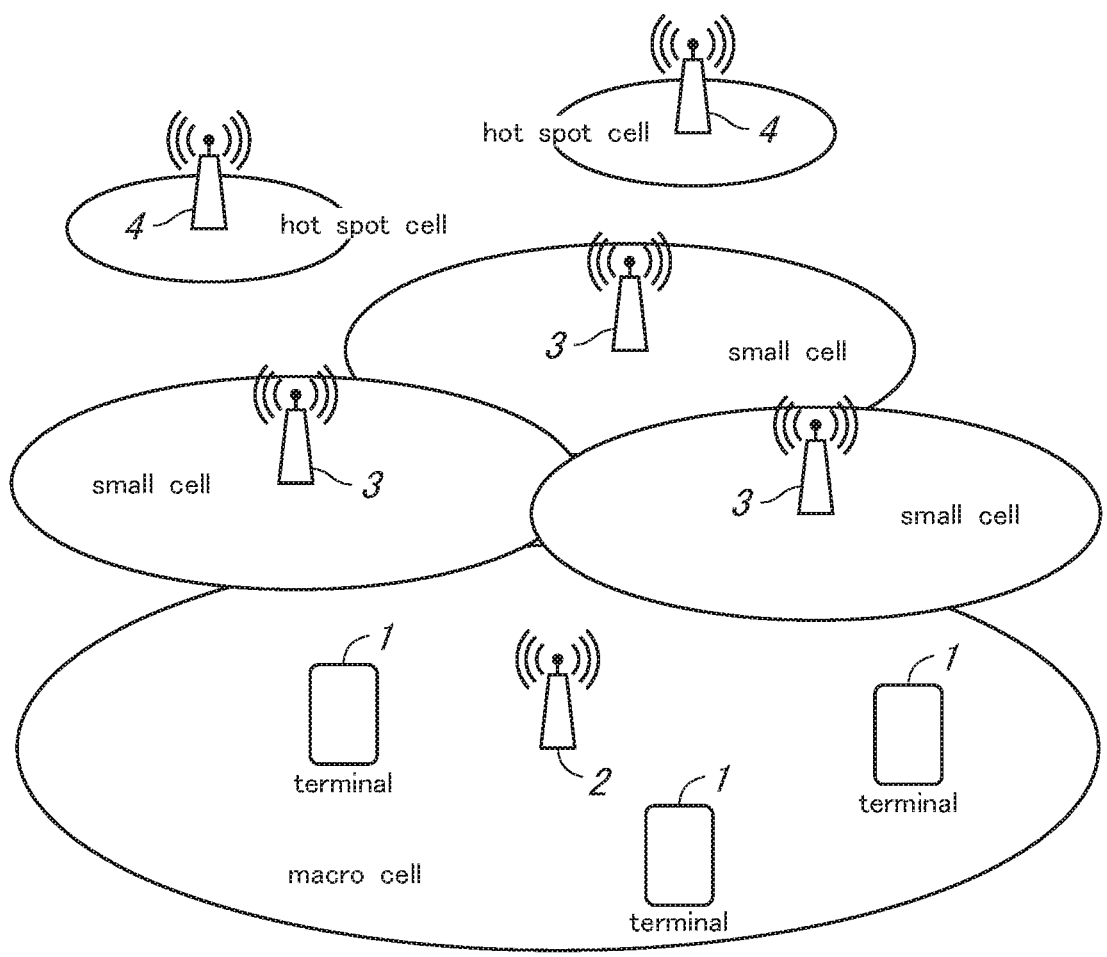
FIG. 1 is a diagram showing a general configuration of a communication system according to a first embodiment of the present invention.

A first aspect of the present invention made to achieve the above-described object is a terminal device configured to measure communication quality levels of communication with peripheral cells notified by a communication control device, and report measurement results to the communication control device, the terminal device comprising:

a communication device configured to communicate with the communication control device;

a location information acquisition device configured to acquire current location information indicating a current location of the terminal device;

an information storage configured to accumulate historical communication information on past communication status at respective locations; and a controller configured to, upon receiving information on the peripheral cells from the communication control device, measure communication quality levels of communication with the peripheral cells, and transmit measurement results to the communication control device;

wherein the controller is configured such that, after determining a current cell in which the terminal device is currently present, when the current cell is a cell providing a largest amount of available bandwidth, the controller selects a first measurement scheme, whereas, when the current cell is a cell providing a smallest amount of available bandwidth, the controller selects a second measurement scheme, and wherein, when the controller selects the first measurement scheme, the controller measures communication quality levels of communication with all the notified peripheral cells, whereas, when the controller selects the second measurement scheme, after the location information acquisition device acquires the current location information, and then, based on the current location information and the historical communication information, the controller extracts one or more of the notified peripheral cells and measures communication quality levels of communication with the extracted one or more peripheral cells.

In this configuration, by selecting the second measurement scheme, a terminal device can narrow down a scope of targets of communication quality measurement to thereby shorten a time required to perform a measurement operation. Moreover, by switching between the first measurement scheme and the second measurement scheme depending on circumstances, a terminal, when using the second measurement scheme, can avoid failure to properly change its connection to a new cell.

A second aspect of the present invention is a terminal device configured to measure communication quality levels of communication with peripheral cells notified by a communication control device, and report measurement results to the communication control device, the terminal device comprising:

a communication device configured to communicate with the communication control device;

a location information acquisition device configured to acquire current location information indicating a current location of the terminal device;

an information storage configured to accumulate historical communication information on past communication status at respective locations; and a controller configured to, upon receiving information on the peripheral cells from the communication control device, measure communication quality levels of communication with the peripheral cells, and transmit measurement results to the communication control device;

wherein the controller is configured to, after determining a current cell, selects one of a first measurement scheme and a second measurement scheme based on information on at least one of an amount of available bandwidth provided by a current cell in which the terminal device is currently present, amounts of available bandwidth provided by the peripheral cells, and an amount of available bandwidth provided by a cell located near the terminal device, and wherein, when the controller selects the first measurement scheme, the controller measures communication quality levels of communication with all the notified peripheral cells, whereas, when the controller selects the second measurement scheme, the location information acquisition device acquires the current location information, and then, based on the current location information and the historical communication information, the controller extracts one or more of the notified peripheral cells and measures communication quality levels of communication with the extracted one or more peripheral cells.

In this configuration, by selecting the second measurement scheme, a terminal device can narrow down a scope of targets of communication quality measurement to thereby shorten a time required to perform a measurement operation. Moreover, by switching between the first measurement scheme and the second measurement scheme depending on circumstances, a terminal, when using the second measurement scheme, can avoid failure to properly change its connection to a new cell.

A third aspect of the present invention is the terminal device of the second aspect, wherein the controller acquires information on amounts of available bandwidth provided by cells located near the terminal device based on the current location information and the historical communication information.

This configuration enables the terminal device to acquire information on a bandwidth provided by a cell located near the terminal device.

A fourth aspect of the present invention is the terminal device of the second aspect, wherein, when the current cell is a cell providing a largest amount of available bandwidth, the controller selects the first measurement scheme, and when the current cell is not the cell providing the largest amount of available bandwidth, the controller selects the second measurement scheme.

This configuration enables the terminal device to select a proper measurement scheme.

A fifth aspect of the present invention is the terminal device of the second aspect, wherein, when the current cell is a cell providing a largest amount of available bandwidth, the controller selects the first measurement scheme, when the current cell is a cell providing a smallest amount of available bandwidth, the controller selects the second measurement scheme, when the current cell is neither the cell providing the largest amount of available bandwidth nor the cell providing the smallest amount of available bandwidth, and no cell providing a larger amount of available bandwidth than the current cell is located near the current cell, the controller selects the first measurement scheme, and when the current cell is neither the cell providing the largest amount of available bandwidth nor the cell providing the smallest amount of available bandwidth and a cell providing a larger amount of available bandwidth than the current cell is located near the current cell, the controller selects the second measurement scheme.

This configuration enables the terminal device to select a proper measurement scheme.

A sixth aspect of the present invention is the terminal device of the second aspect, wherein, when no cell providing a larger amount of available bandwidth than the current cell is located near the current cell, the controller selects the first measurement scheme, and when a cell providing a larger amount of available bandwidth than current cell is located near the current cell, the controller selects the second measurement scheme.

This configuration enables the terminal device to select a proper measurement scheme.

A seventh aspect of the present invention is the terminal device of the second aspect, wherein, when the peripheral cells do not include any cell providing a larger amount of available bandwidth than the current cell, the controller selects the first measurement scheme, and when the peripheral cells include a cell providing a larger amount of available bandwidth than the current cell, the controller selects the second measurement scheme.

This configuration enables the terminal device to select a proper measurement scheme.

An eighth aspect of the present invention is the terminal device of the second aspect, wherein, when the current cell is a cell providing a largest amount of available bandwidth, the controller selects the first measurement scheme, when the current cell is a cell providing a smallest amount of available bandwidth, the controller selects the second measurement scheme, when the current cell is neither the cell providing the largest amount of available bandwidth nor the cell providing the smallest amount of available bandwidth, and the peripheral cells do not include any cell providing a larger amount of available bandwidth than the current cell, the controller selects the first measurement scheme, and when the current cell is neither the cell providing the largest amount of available bandwidth nor the cell providing the smallest amount of available bandwidth, and the peripheral cells include a cell providing a larger amount of available bandwidth than the current cell, the controller selects the first measurement scheme.

This configuration enables the terminal device to select a proper measurement scheme.

A ninth aspect of the present invention is the terminal device of the second aspect, wherein, when the current cell is a cell providing a largest amount of available bandwidth, the controller selects the first measurement scheme, when the current cell is a cell providing a smallest amount of available bandwidth, the controller selects the second measurement scheme, when the current cell is neither the cell providing the largest amount of available bandwidth nor the cell providing the smallest amount of available bandwidth, and the peripheral cells do not include any cell providing a larger amount of available bandwidth than the current cell, the controller selects the first measurement scheme, and when the current cell is neither the cell providing the largest amount of available bandwidth nor the cell providing the smallest amount of available bandwidth, and the peripheral cells include a cell providing a larger amount of available bandwidth than the current cell, the controller selects the first measurement scheme, and when a cell providing a larger amount of available bandwidth than the current cell is located near the current cell, the controller selects the second measurement scheme.

This configuration enables the terminal device to select a proper measurement scheme.

A tenth aspect of the present invention is a communication system in which a communication control device notifies a terminal device of peripheral cells, and the terminal device, in turn, measures communication quality levels of communication with the peripheral cells, and reports measurement results to the communication control device, wherein the terminal device comprises:

a communication device configured to communicate with the communication control device;

a location information acquisition device configured to acquire current location information indicating a current location of the terminal device;

an information storage configured to accumulate historical communication information on past communication status at respective locations; and a controller configured to, upon receiving information on the peripheral cells from the communication control device, measure communication quality levels of communication with the peripheral cells and transmit measurement results to the communication control device, and wherein the controller is configured such that, after determining a current cell in which the terminal device is currently present, when the current cell is a cell providing a largest amount of available bandwidth, the controller selects a first measurement scheme, whereas, when the current cell is a cell providing a smallest amount of available bandwidth, the controller selects a second measurement scheme, and wherein, when the controller selects the first measurement scheme, the controller measures communication quality levels of communication with all the notified peripheral cells, whereas, when the controller selects the second measurement scheme, after the location information acquisition device acquires the current location information, and then, based on the current location information and the historical communication information, the controller extracts one or more of the notified peripheral cells and measures communication quality levels of communication with the extracted one or more peripheral cells.

This configuration enables a terminal device to properly narrow down a scope of targets of communication quality measurement to thereby shorten a time required to perform a measurement operation in the same manner as the first aspect of the present invention.

An eleventh aspect of the present invention is a communication system in which a communication control device notifies a terminal device of peripheral cells, and the terminal device, in turn, measures communication quality levels of communication with the peripheral cells and reports measurement results to the communication control device, wherein the terminal device comprises:

a communication device configured to communicate with the communication control device;

a location information acquisition device configured to acquire current location information indicating a current location of the terminal device;

an information storage configured to accumulate historical communication information on past communication status at respective locations; and a controller configured to, upon receiving information on the peripheral cells from the communication control device, measure communication quality levels of communication with the peripheral cells and transmit measurement results to the communication control device;

wherein the controller is configured to, after determining a current cell, selects one of a first measurement scheme and a second measurement scheme based on information on an amount of available bandwidth provided by a current cell in which the terminal device is currently present and/or an amount of available bandwidth provided by a cell located near the terminal device, and wherein, when the controller selects the first measurement scheme, the controller measures communication quality levels of communication with all the notified peripheral cells, whereas, when the controller selects the second measurement scheme, the location information acquisition device acquires the current location information, and then, based on the current location information and the historical communication information, the controller extracts one or more of the notified peripheral cells and measures communication quality levels of communication with the extracted one or more peripheral cells.

This configuration enables a terminal device to properly narrow down a scope of targets of communication quality measurement to thereby shorten a time required to perform a measurement operation in the same manner as the second aspect of the present invention.

A twelfth aspect of the present invention is a communication quality measurement method performed by a terminal device for measuring communication quality levels of communication with peripheral cells notified by a communication control device and reporting measurement results to the communication control device, the method comprising:

upon the terminal device receiving information on the peripheral cells, when a current cell in which the terminal device is present is a cell providing a largest amount of available bandwidth, the terminal device selecting a first measurement scheme, and when the current cell is a cell providing a smallest amount of available bandwidth, the terminal device selecting a second measurement scheme;

when the first measurement scheme is selected, the terminal device measuring communication quality levels of communication with all the peripheral cells, and when the second measurement scheme is selected, the terminal device acquiring current location information, and then, based on the current location information and historical communication information, which is information on past communication status at respective locations, the terminal device extracting one or more of the peripheral cells and measures communication quality levels of communication with the extracted one or more peripheral cells; and the terminal device transmitting the measurement results to the communication controller.

This configuration enables a terminal device to properly narrow down a scope of targets of communication quality measurement to thereby shorten a time required to perform a measurement operation in the same manner as the first aspect of the present invention.

A thirteenth aspect of the present invention is a communication quality measurement method performed by a terminal device for measuring communication quality levels of communication with peripheral cells notified by a communication control device and reporting measurement results to the communication control device, the method comprising:

upon the terminal device receiving information on the peripheral cells, the terminal device selecting a first measurement scheme and/or a second measurement scheme based on at least one of an amount of available bandwidth provided by a current cell in which the terminal device is currently present, amounts of available bandwidth provided by the peripheral cells, and an amount of available bandwidth provided by a cell located near the terminal device;

when the first measurement scheme is selected, the terminal device measuring the communication quality levels of communication with all the peripheral cells, and when the second measurement scheme is selected, the terminal device acquiring current location information indicating a current location of the terminal device, and then, based on the current location information and historical communication information on past communication status at respective locations, the terminal device extracting one or more of the peripheral cells and measures communication quality levels of communication with the extracted one or more peripheral cells; and the terminal device transmitting measurement results to the communication controller.

This configuration enables a terminal device to properly narrow down a scope of targets of communication quality measurement to thereby shorten a time required to perform a measurement operation in the same manner as the second aspect of the present invention.

Embodiments of the present invention will be described below with reference to the drawings.

First Embodiment

FIG. 1 is a diagram showing a general configuration of a communication system according to a first embodiment of the present invention.

The communication system includes a terminal 1, a macro cell base station 2 (communication control device), small cell band base stations 3, and hot spot cell base stations 4. Each small cell is disposed so as to overlap the macro cell, and each hot spot cell base station is disposed so as to overlap the macro cell and a small cell.

The terminal 1 may be a smartphone, a tablet terminal, and any other suitable terminal device. The terminal 1 is capable of communicating with all the base stations including the macro cell base station 2, the small cell base stations 3, and the hot spot cell base stations 4.

The macro cell base station 2 performs wireless communication using a UHF band, such as wireless communication using LTE (Long Term Evolution) scheme. The macro cell base station 2 is a C-plane cell, which handles control plane (C-Plane) massages for transmitting control signals. In other embodiments, the macro cell base station 2 may be used as a U-Plane cell, which handles user plane (U-Plane) messages for transmitting user data.

The small cell base stations 3 perform wireless communication using a low SHF band. The hot spot cell base stations 4 perform wireless communication using a high SHF band. The small cell base stations 3 and the hot spot cell base stations 4 are used as cells handling user plane (U-Plane) messages for transmitting user data.

The hot spot cell base stations 4 may perform wireless communication using an EHF band. The small base stations 3 and the hot spot cell base stations 4 may be configured to perform wireless LAN communication using a wireless communication scheme such as a WiFi (Registered Trademark) communication system or a WiGig (Registered Trademark) communication system.

Figure 2:
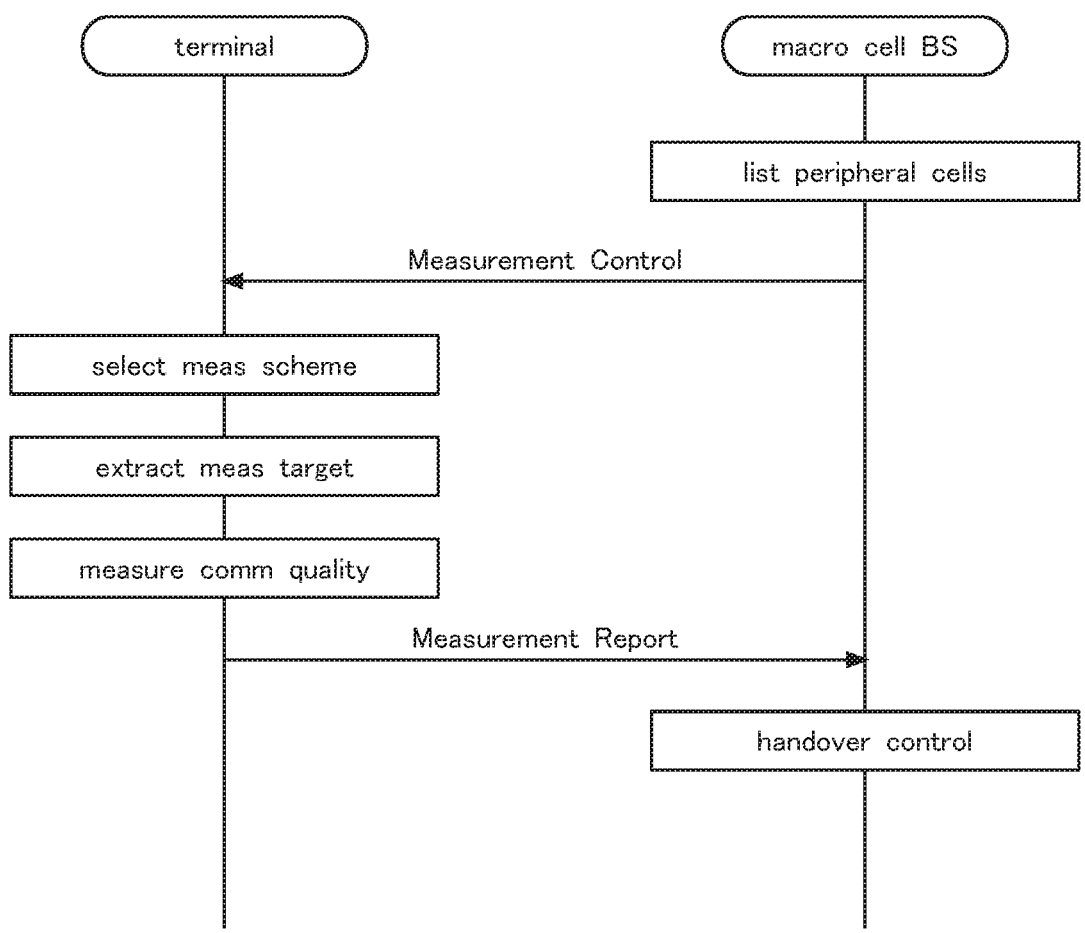
FIG. 2 is a sequence diagram showing an outline of operations of a terminal 1 and a macro cell base station 2.

Next, operations performed by the terminal 1 and the macro cell base station 2 will be described. FIG. 2 is a sequence diagram showing an outline of operations of the terminal 1 and the macro cell base station 2.

The macro cell base station 2 first generates a connection destination candidate list, in which peripheral cells to which the terminal 1 is connectable are listed as connection destination candidates. Then, the macro cell base station transmits a measurement control message (Measurement Control) including information on the peripheral cells.

Upon receiving the measurement control message (Measurement Control) transmitted from the macro cell base station 2, the measurement scheme selector 22 selects a measurement scheme used for communication quality measurement based on information on a current cell (cell in which the terminal device is currently present) and other information. Next, according to the selected measurement scheme, the measurement target extractor extracts one or more cells as targets of communication quality measurement. Then, according to the selected measurement scheme, the communication quality measurer measures communication quality levels (received powers) of communication with the extracted one or more peripheral cells or with all the peripheral cells notified by the measurement control message. Then, the terminal transmits a measurement report message (Measurement Report) to the macro cell base station 2, where the measurement report message includes report information including measurement results; that is, results of the communication quality measurement.

Upon receiving the measurement report message (Measurement Report) transmitted from the terminal 1, the macro cell base station 2 determines a cell used as a connection destination for the terminal 1 based on the report information included in the measurement report message, and performs control regarding a handover. When the measurement report message from the terminal 1 includes only a measurement result of one cell, the cell is determined as a connection destination, and when the measurement report message from the terminal 1 includes measurement results of two or more cells, the cell with which the highest communication quality level of communication is measured by the terminal is determined as a connection destination.

Figure 3:
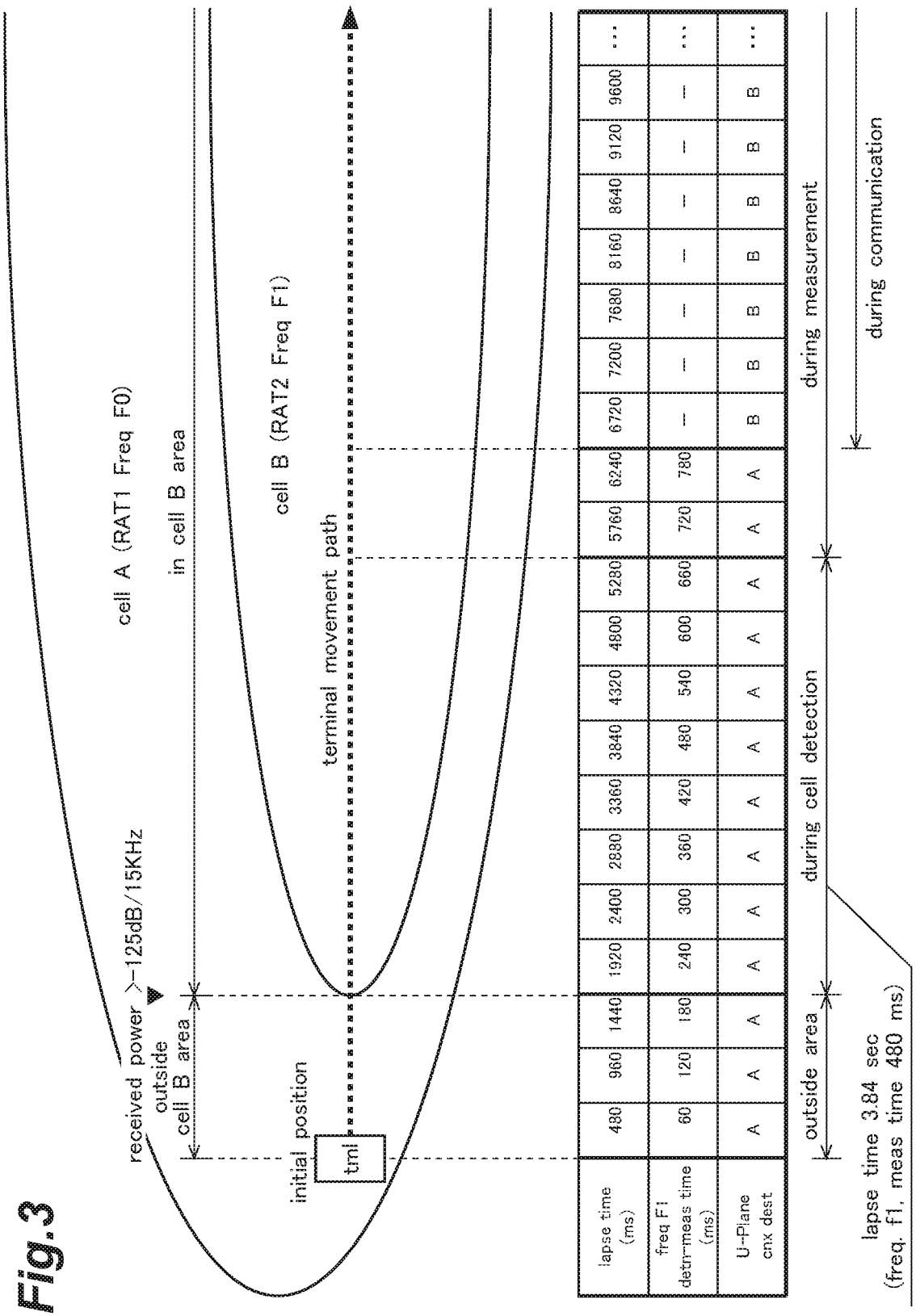
FIG. 3 is an explanatory view showing how a communication quality measurement is performed.
Figure 4:
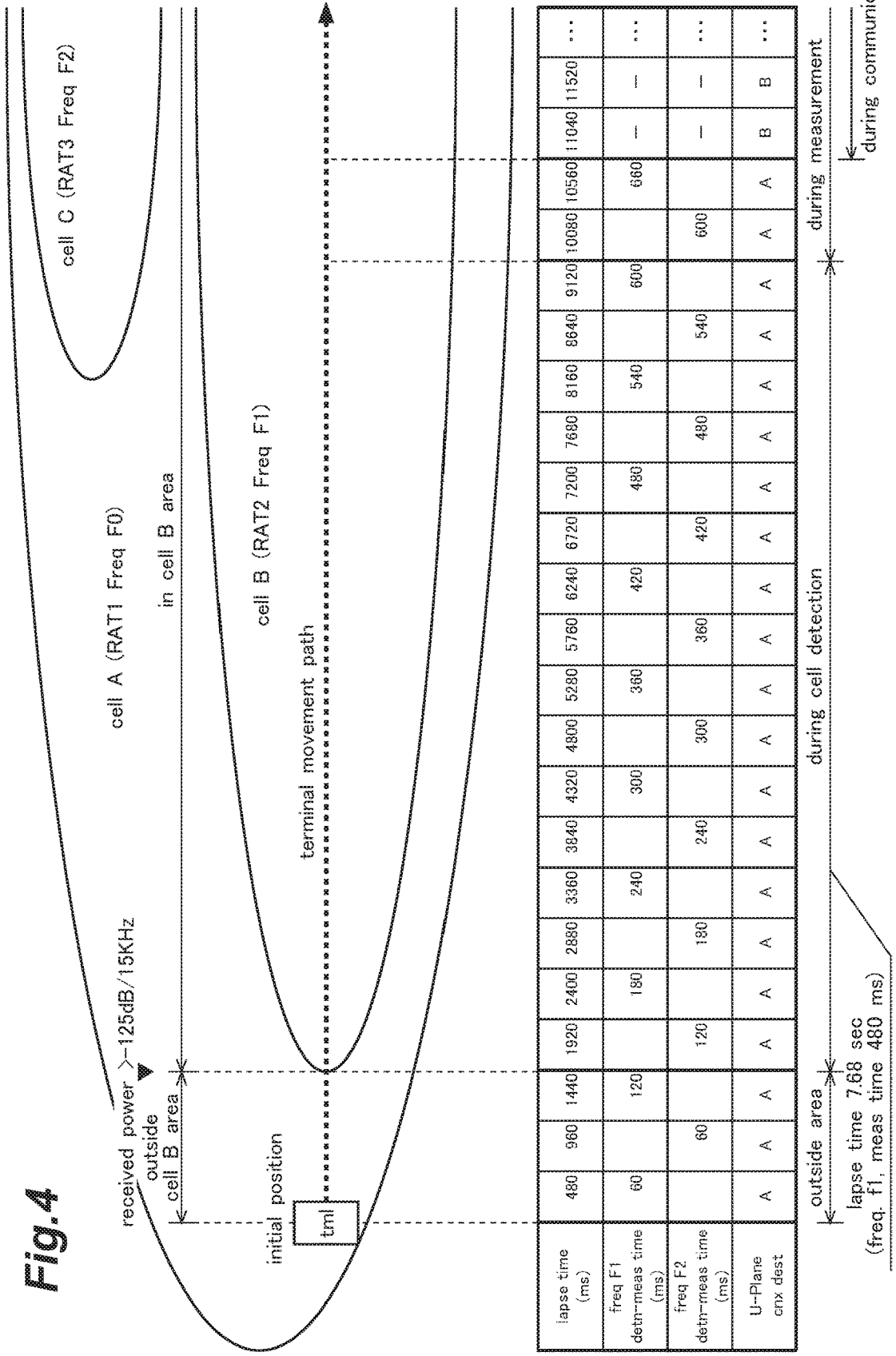
FIG. 4 is an explanatory view showing how a communication quality measurement is performed.

Next, a communication quality measurement performed by the terminal 1 will be described. FIGS. 3 and 4 are explanatory views each showing how a communication quality measurement is performed.

In an example shown in FIG. 3, a cell B (e.g. a small cell or a hot spot cell) providing a larger amount of available bandwidth than a cell A (e.g. a macro cell) overlaps the cell A. In an example shown in FIG. 4, cells B and C (e.g. small cells and hot spot cells) each providing a larger amount of available bandwidth than a cell A (e.g. a macro cell) overlap the cell A. In the example shown in FIGS. 3 and 4, the terminal 1 is assumed to move from a place within a communication area of the cell A to that of the cell B.

In the example shown in FIG. 3, the two cells A and B are peripheral cells, and in the example shown in FIG. 4, the three cells A, B, and C are peripheral cells. Among the peripheral cells, the current cell (the cell in which the terminal 1 is currently present) is not determined as a target of communication quality measurement because the communication quality level (radio wave intensity) is already known. Therefore, in the example shown in FIG. 3, communication quality measurement is performed on one cell (one frequency), and in the example shown in FIG. 4, communication quality measurement is performed on two cells (two frequencies).

In a case where the terminal 1 is located within the cell A (initial location), upon receiving a measurement control message (Measurement Control), the terminal 1 starts communication quality measurement. In this case, when the terminal 1 is located outside the communication area of the cell B, a cell detection condition; that is, a condition in which the radio wave intensity is high enough to measure communication quality level (received power>−125 dB/15 KHz) is not met. However, when the terminal 1 enters the communication area of the cell B, the cell detection condition is met. When the cell detection condition is met predetermined successive times (e.g. eight successive times), the terminal determines that a cell is detected and transmits a measurement report message (Measurement Report) including a measurement result of the cell B to the cell A's base station. In response to a handover massage transmitted from the cell A's base station, a U-Plane cell as a connection destination is switched from the cell A to the cell B so that the terminal 1 starts to transmit user data via the cell B.

In the process, the communication quality measurement is performed in the background in parallel with main processing operations such as communication of user data. For example, 60 msec out of 480 msec is allocated to the communication quality measurement. Since a cell is determined to be detected when received power measured in each of the 60 msec measurements exceeds a predetermined threshold level eight successive times, it takes at least 3.84 sec (=480 msec×8) to detect one cell.

Therefore, in cases where communication quality measurement is performed on one cell (one frequency) as shown in FIG. 3, 3.84 sec is required to perform communication quality measurement, whereas, in cases where communication quality measurement is performed on two cells (two frequencies) as shown in FIG. 4, 7.68 (=3.84 sec×2) is required to perform communication quality measurement. In cases where four peripheral cells are present for the terminal and communication quality measurement is performed on three cells (other than the current cell), which is not shown in the drawings, 15.36 (=3.84 sec×3) is required to perform communication quality measurement.

When communication quality measurement is performed on multiple cells as shown in FIG. 4, 60 msec measurements are performed successively with changing a measurement target cell (frequency), each 60 msec measurement being repeated eight times in one round.

In this way, the smaller the number of targets of communication quality measurement, the shorter the time required for communication quality measurement.

Thus, in the present embodiment, the terminal is controlled to narrow down a scope of targets of communication quality measurement to one measurement target. Thus, as a time required to perform a measurement operation becomes short, this configuration can shorten a time required to complete a handover, thereby enabling a quick increase in throughput.

In the present embodiment, the terminal accumulates information on one or more connected cells (cells to which the terminal 1 was connected) at respective locations as historical information on past communication status. Thus, based on current location information and historical communication information, the terminal 1 can extract cells to which the terminal 1 was connected in the past as targets of communication quality measurement, and perform communication quality measurement only on the extracted cells.

Next, how the terminal changes its connection to cells will be described. FIGS. 5 and 6 are explanatory views each showing how the terminal changes its connection to cells and how a throughput changes, with change in measurement scheme.

In the present embodiment, as described above, a terminal is controlled to narrow down a scope of targets of communication quality measurement to one cell. However, as explained below, this method in which a measurement target scope is narrowed down to one cell can be, in some cases, less suitable than a standard measurement method, in which communication quality measurement is performed on all the peripheral cells notified by a measurement control message (Measurement Control) transmitted from the macro cell base station 2.

In the present embodiment, the standard measurement method in which communication quality measurement is performed on all the peripheral is defined as a first measurement scheme, and a method in which a measurement target scope is narrowed down to one cell is defined as a second measurement scheme.

In the example shown in FIG. 5, a terminal changes its connection from a cell providing a small amount of available bandwidth (narrow bandwidth cell) to a cell providing a large amount of available bandwidth (wide bandwidth cell). Specifically, the terminal's connection target is changed in the order of a macro cell, a small cell, and a hot spot cell.

In examples shown in FIGS. 5(A-1) and 5(A-2), a base station notifies the terminal of two cells (other than the current cell); that is, one small cell and one hot spot cell as peripheral cells (connection candidates).

In these examples, in a case where the first measurement scheme is used, when the terminal is moving from the macro cell into the small cell, the terminal is notified of the small cell and the hot spot cell as two peripheral cells, and performs communication quality measurement on these two cells, which takes 7.86 sec. Next, when the terminal is moving from the small cell into the hot spot cell, the terminal is notified of the hot spot cell as a peripheral cell, and performs communication quality measurement on this cell, which takes 3.84 sec.

In a case where the second measurement scheme is used, when the terminal is moving from the macro cell into the small cell, the terminal is notified of only the small cell as a peripheral cell, and performs communication quality measurement on this cell, which takes 3.84 sec, which is shorter than the case of the first measurement scheme. Next, when the terminal is moving from the small cell into the hot spot cell, the terminal is notified of only the hot spot cell as a peripheral cell, and performs communication quality measurement on one cell, which takes 3.84 sec in the same manner as the case of the first measurement scheme.

In the examples shown in FIGS. 5(B-1) and 5(B-2), a base station notifies the terminal of four cells (other than the current cell), in particular, two small cells and two hot spot cells as peripheral cells (connection candidates).

In these examples, in a case where the first measurement scheme is used, when the terminal is moving from the macro cell into a small cell, the terminal is notified of the small cells and the hot spot cells as four peripheral cells, and performs communication quality measurement on these four cells, which takes 15.36 sec. Next, when the terminal is moving from the small cell into a hot spot cell, the terminal is notified of three cells (one small cell and two hot spot cells) as three peripheral cells (other than the current cell), and performs communication quality measurement on these three cells, which takes 11.52 sec.

In a case where the second measurement scheme is used, when the terminal is moving from the macro cell into a small cell, the terminal is notified of only one small cell as a measurement target, and performs communication quality measurement on this cell, which takes 3.84 sec, which is shorter than the case of the first measurement scheme. Next, when the terminal is moving from the small cell into a hot spot cell, the terminal is notified of only the hot spot cell as a measurement target, and performs communication quality measurement on this cell, which takes 3.84 sec, which is shorter than the case of the first measurement scheme.

In this way, when a terminal's connection target changes from a narrow bandwidth cell to a wide bandwidth cell, adopting the second measurement scheme can shorten a time required for measurement, thereby enabling a quick increase in throughput. Moreover, as the larger the number of peripheral cells notified by the macro cell base station 2 is, the more significant the effect of shortening a time for measurement becomes.

In the examples shown in FIG. 6, a terminal changes its connection target from a wide bandwidth cell to a narrow bandwidth cell. Specifically, the terminal's connection target is changed in the order of a hot spot cell, a small cell, and a macro cell.

In the examples shown in FIGS. 6(A-1) and 5(A-2), a base station notifies the terminal of one cell (other than the current cell), in particular, a small cell as a peripheral cell (connection candidate).

In these examples, in a case where the first measurement scheme is used, during the terminal is present in the hot spot cell, the terminal is notified of the small cell as a peripheral cell (other than the current cell), and performs communication quality measurement on the small cell. Thus, the connection target is changed to the small cell at the time when the terminal moves out of the hot spot cell. Next, during the terminal is present in the small cell, the terminal performs no communication quality measurement since there is no peripheral cell other than the small cell, in which the terminal is present, and the connection target is changed to the macro cell at the time when the terminal moves out of the small cell.

In a case where the second measurement scheme is used, during the terminal is present in the hot spot cell, the terminal performs no communication quality measurement on the hot spot cell, which is the current cell, and since the terminal performs no communication quality measurement on the small cell, the connection target is changed to the macro cell at the time when the terminal moves out of the hot spot cell. During the terminal is present in the macro cell, the measurement scheme selector 22 selects the small cell as a measurement target cell. The terminal performs communication quality measurement on the small cell (which takes 3.84 sec), and then enters the small cell. Next, the connection target is changed to the macro cell at the time when the terminal moves out of the small cell in the same manner as the case of the first measurement scheme.

In examples shown in FIGS. 6(B-1) and 6(B-2), a base station notifies the terminal of three cells (other than the current cell), in particular, two small cells and one hot spot cells as peripheral cells (connection candidates).

In these examples, although the number of the peripheral cells notified by the base station is different from that of the example shown in FIG. 6(A), how the terminal changes its connection to cells and a throughput changes is the same as the case of the example shown in FIG. 6(A). In the case of the second measurement scheme, how the terminal changes its connection to cells and a throughput changes is the same as the case of the example shown in FIG. 6(A).

In this way, in cases where a terminal's connection target changes from a narrow bandwidth cell to a wide bandwidth cell and the second measurement scheme is used, when the terminal is present in the wide bandwidth cell, the measurement scheme selector 22 selects the wide bandwidth cell in preference as a measurement target and does not perform measurement on the narrow bandwidth cell. Thus, when the terminal's connection target changes from the hot spot cell to the small cell, the connection target cannot change from the hot spot cell directly to the small cell, but can change to the macro cell first and then to the small cell. This causes a problem of a temporal decrease in throughput. The problem occurs in the same way even if the number of peripheral cells increases.

Accordingly, when a terminal's connection target changes from a narrow bandwidth cell to a wide bandwidth cell, the second measurement scheme is more advantageous than the first measurement scheme because adopting the second measurement scheme can increase a throughput more quickly. However, when a terminal's connection target changes from a wide bandwidth cell to a narrow bandwidth cell, the first measurement scheme is more advantageous than the second measurement scheme because adopting the second measurement scheme causes the problem of a temporal decrease in throughput.

Thus, in the present embodiment, the measurement scheme is selected based on which cell is the current cell (in which the terminal 1 is currently present) such that, when the second measurement scheme more advantageous than the first measurement scheme, the second measurement scheme is adopted as much as possible. In particular, in the present embodiment, the measurement scheme is selected according to whether or not the terminal 1 is located in a hot spot cell; that is, a cell providing a largest amount of available bandwidth (widest bandwidth cell). Specifically, when the terminal 1 is in the hot spot cell, the first measurement scheme is selected, and when the terminal 1 is not located in the hot spot cell; that is, when the terminal 1 is located in the macro cell or the small cell, the second measurement scheme is selected.

Figure 7:
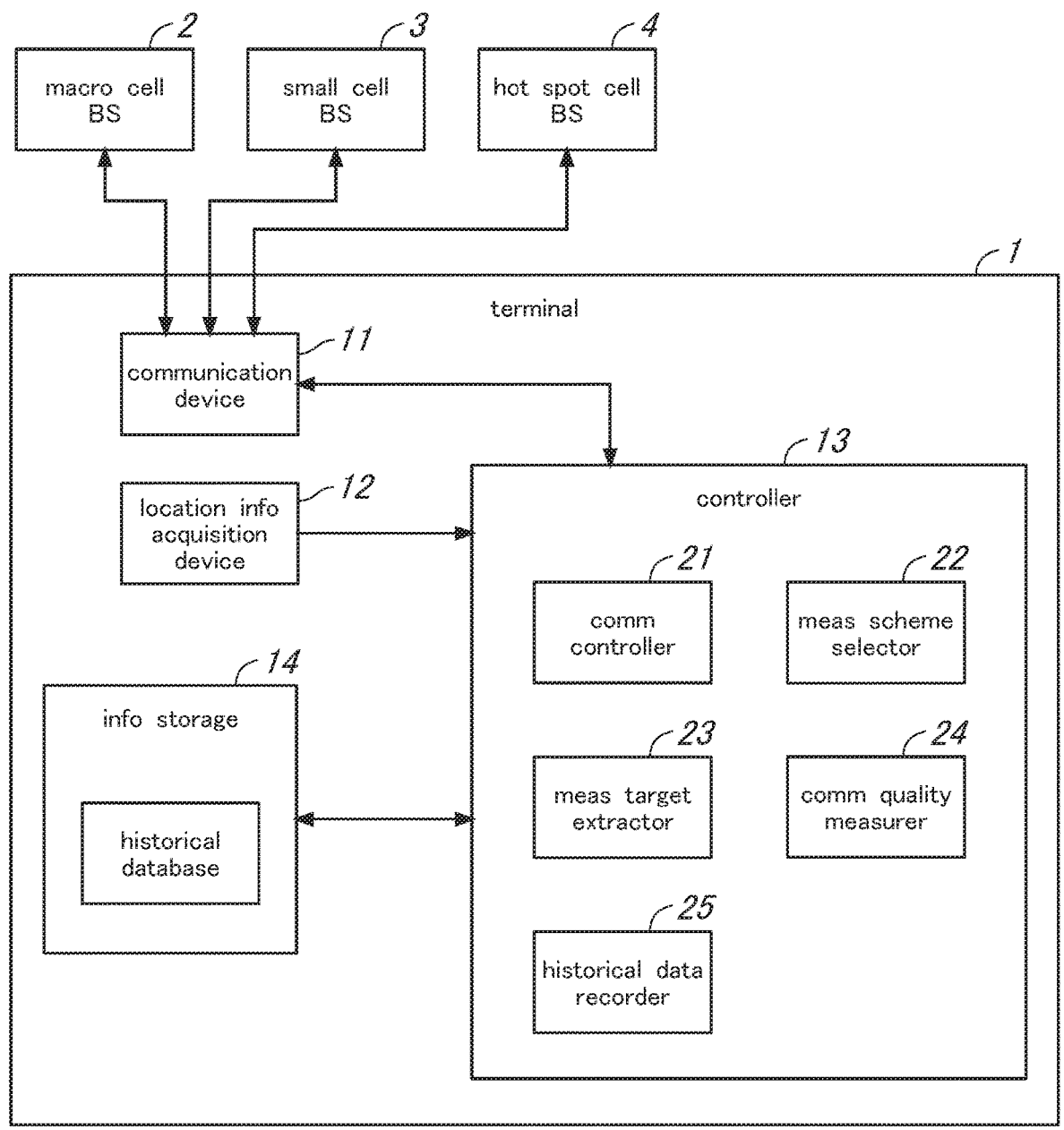
FIG. 7 is a diagram showing a general configuration of a terminal 1.

Next, a general configuration of a terminal 1 will be described. FIG. 7 is a diagram showing a general configuration of the terminal 1.

The terminal 1 includes a communication device 11, a location information acquisition device 12, a controller 13, and an information storage 14.

The communication device 11 communicates with a macro cell base station 2, a small cell base station 3, and a hot spot cell base station 4.

The location information acquisition device 12 acquires location information on the location of the terminal 1 by using a satellite positioning system such as a GPS (Global Positioning System).

The information storage 14 stores information on the historical database managed by the controller 13, and programs executed by a processor which implements the controller 13, and any other type of information. The historical database stores historical communication information on past communication status at respective locations in a communication area.

The controller 13 includes a communication controller 21, a measurement scheme selector 22, a measurement target extractor 23, a communication quality measurer 24, and a historical data recorder 25. The controller 13 is implemented by the processor, and each part of the controller 13 is implemented by causing the processor to execute a prescribed program stored in the information storage 14.

The communication controller 21 controls communication of the communication device 11 with the macro cell base station 2, the small cell base station 3, and the hot spot cell base station 4.

The measurement scheme selector 22 acquires information on the current cell (the cell in which the terminal 1 is currently present) from the communication controller 21, and based on the current cell, selects a scheme of communication quality measurement (first measurement scheme or second measurement scheme).

The measurement target extractor 26 is configured such that, when the measurement scheme selector 22 selects the second measurement scheme, the measurement target extractor 26 acquires historical communication information at the current location of the terminal 1 acquired by the location information acquisition device 12 from the historical database in the information storage 14, and extracts target cells of communication quality measurement based on the historical communication information at the current location of the terminal 1.

The communication quality measurer 24 is configured such that, when the measurement scheme selector 22 selects the first measurement scheme, the communication quality measure 27 measures communication quality levels (such as received powers) of communication with all the peripheral cells notified by a measurement control message (Measurement Control) transmitted from the macro cell base station 2, and that, when the measurement scheme selector 22 selects the second measurement scheme, the communication quality measure 27 measures communication quality levels (such as received powers) of communication with the cells extracted by the measurement target extractor 23.

The historical data recorder 25 acquires information on the current communication status (connection destination information and communication quality information), and then records the information in the historical database as historical information at the current location of the terminal 1. By periodically performing this recordation of historical information, historical information at all the locations which the terminal 1 passes can be recorded in the historical database.

Next, the historical database will be described. FIG. 8 is an explanatory view showing an example of registered data in the historical database.

The historical database includes a connection destination identifier, a frequency, and a communication scheme as connection destination information at each location, as well as a received power, a throughput, and a communication data amount as communication quality information at each location. The connection destination identifier may be identification information (such as cell IDs) identifying connection destination cells (base stations 2 to 4).

The communication quality information is not limited to a received power, a throughput, and a communication data amount, and may include an amount of interference, a disconnection rate, an error rate, a connection rate or other information.

The history information may be registered in the history database for each time period of a day. This configuration enables the terminal to be connected to the optimal connection destination when the optimal connection destination differs depending on the time period of a day.

Since there's no record of communication on locations where the terminal 1 has not passed in the past, no historical information on such locations is present in the database. In this case, historical information may be obtained through interpolating the historical information on sections around the location or section without communication record.

The historical database may be shared with one or more different terminals 1. In an example, a server may be configured such that pieces of historical information associated with the respective terminals 1 are uploaded to the server so that the server can integrate the uploaded historical information and distribute the integrated historical information to the respective terminals 1. This allows each terminal 1 to use the shared historical information on locations where the terminal 1 has not passed in the past.

The location may be defined by latitude, longitude, altitude, or by a predetermined original coordinate. Alternatively, mesh element areas may be determined over all the coverages of a macro cell, small cells, and hot spot cells, each mesh element area having a uniform sized prescribed shape (e.g. square, circle, ellipse), so that historical information can be recorded on each mesh element area.

Figure 9:
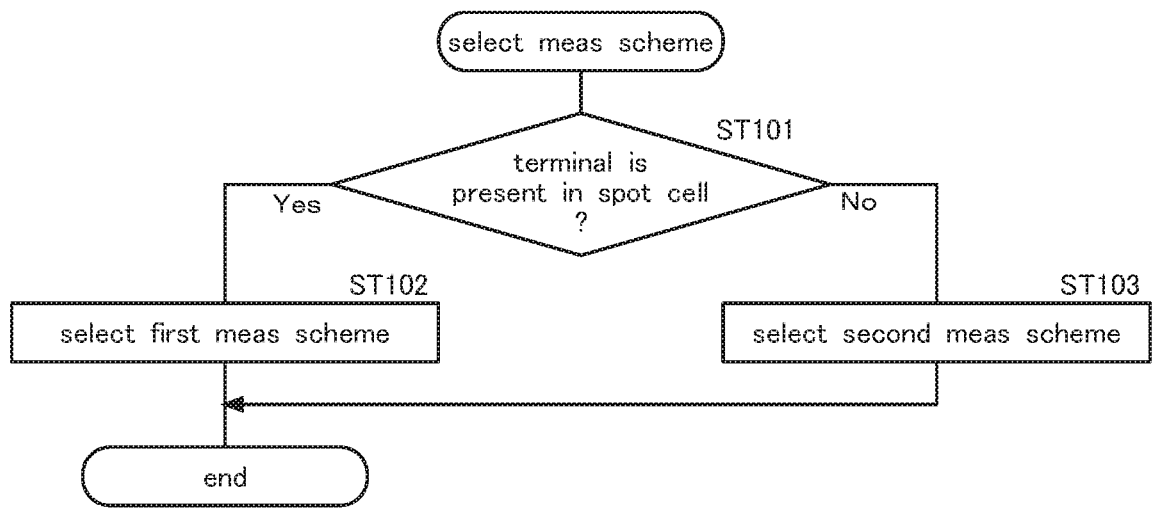
FIG. 9 is a flowchart showing an operation procedure of a measurement scheme selector 22.

Next, an operation procedure of the measurement scheme selector 22 will be described. FIG. 9 is a flowchart showing an operation procedure of the measurement scheme selector 22.

First, the measurement scheme selector 22 determines whether or not the terminal 1 is in the hot spot cell (ST101). When terminal 1 is in the hot spot cell (Yes in ST101), the measurement scheme selector 22 selects the first measurement scheme (ST102). When the terminal 1 is not located in the hot spot cell (No in ST101); that is, when the terminal 1 is located in the macro cell or small cell, the measurement scheme selector 22 selects the second measurement scheme (ST103).

Figure 10:
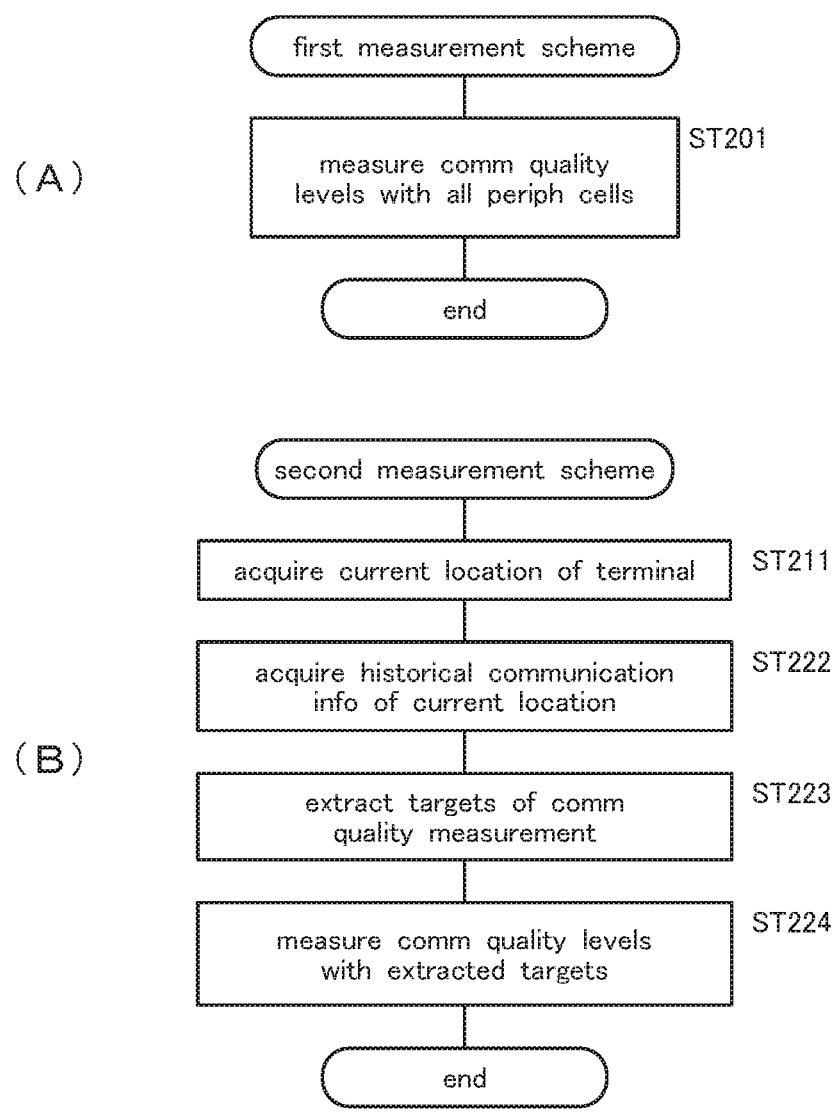
FIG. 10 is a flowchart showing processing operation procedures of a measurement target extractor 23 and a communication quality measurer 24.

Next, processing operation procedures of the measurement target extractor 23 and the communication quality measurer 24 will be described. FIG. 10 is a flowchart showing processing operation procedures of the measurement target extractor 23 and the communication quality measurer 24.

In the first measurement scheme, as shown in FIG. 10(A), the communication quality measurer 24 measures communication quality levels of communication with all the peripheral cells notified by a measurement control message transmitted from the macro cell base station 2 (ST201).

In the second measurement scheme, as shown in FIG. 10B, first, the measurement target extractor 23 acquires the current location of the terminal 1 from the location information acquisition device 12 (ST211). Next, the controller 13 acquires, from the history database in the information storage 14, the communication history information at the current location of the terminal 1, more specifically, information on past connected cells at the current location (cells to which the terminal 1 was connected in the past at the current location) and past communication quality information associated with the past connected cells (ST222).

Next, the measurement target extractor 23 extracts, as targets of communication quality measurement, cells which are among the past connected cells, meet the requirements of communication quality level, and are included in the peripheral cells notified by the measurement control message (ST223). Then, the communication quality measurer 24 measures communication quality levels of communication with the measurement target cells extracted by the measurement target extractor 23 (ST224).

Second Embodiment

Figure 15:
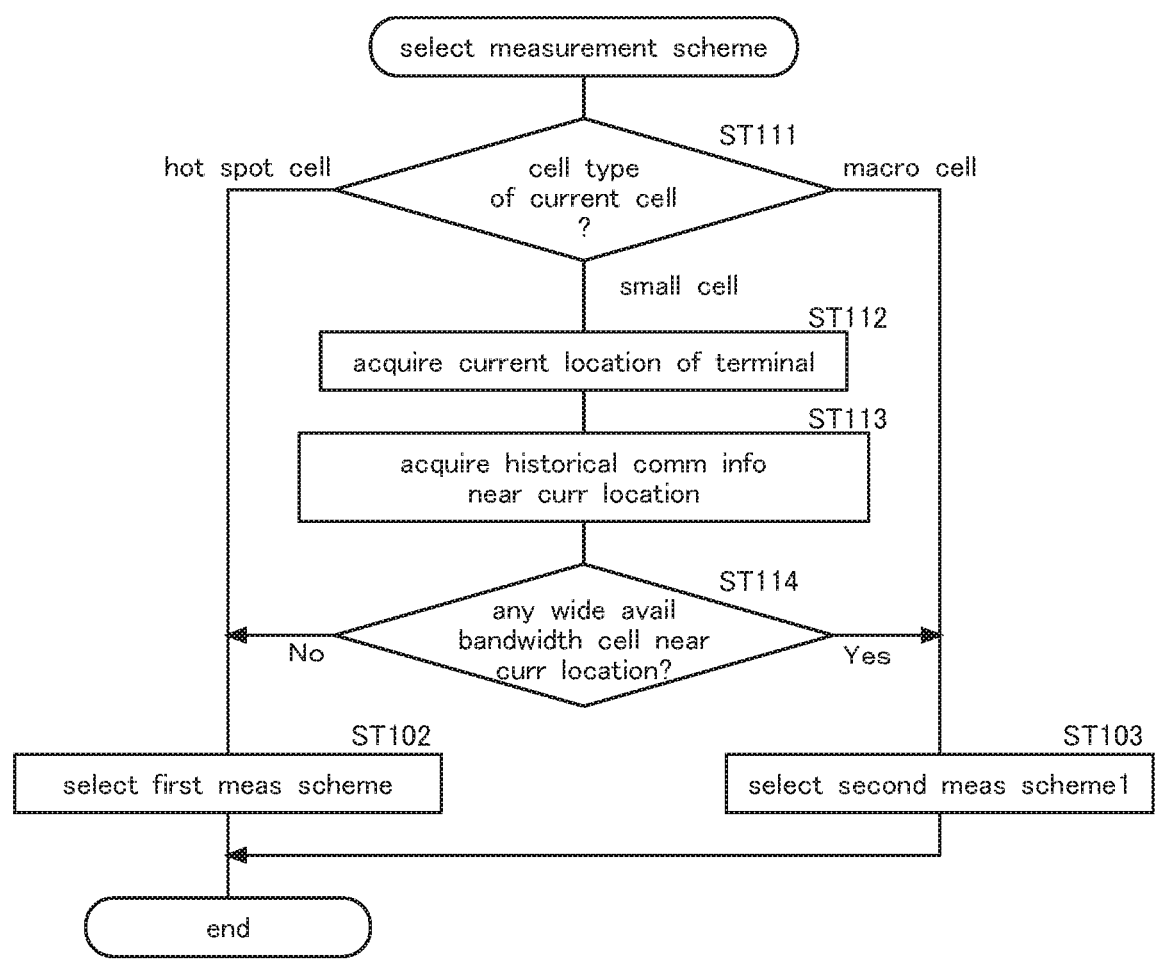
FIG. 15 is a flowchart showing a processing operation procedure of a measurement scheme selector 22 according to a second embodiment of the present invention.

Next, a second embodiment of the present invention will be described. Except for what will be discussed here, this embodiment is the same as the above-described embodiment. FIGS. 11 to 13 are explanatory views each showing how a terminal changes its connection to cells and how a throughput changes, with the change in measurement schemes. FIG. 14 is an explanatory view showing which measurement scheme is more advantageous, the first measurement scheme or the second measurement scheme, in each combination of a current cell and a destination cell. FIG. 15 is a flowchart showing a processing operation procedure of a measurement scheme selector 22 according to a second embodiment of the present invention.

FIG. 11 is cases where the terminal 1 is present in a hot spot cell. The cases of FIG. 11 include a case where a connection destination changes from the hot spot cell to a different hot spot cell as shown in FIG. 11(A-1), a case where a connection destination changes from the hot spot cell to a small cell as shown in FIG. 11(B-1), and a case where a connection destination changes from the hot spot cell to a macro cell as shown in FIG. 11(C-1).

In the case where a connection destination changes from the hot spot cell to the different hot spot cell as shown in FIG. 11(A-1), when either of the first or second measurement schemes is selected, the connection destination changes from the hot spot cell directly to the different hot spot cell as shown in FIG. 11(A-2). Thus, the first and second measurement schemes have no preference for selection.

In the case where a connection destination changes from the hot spot cell to the small cell as shown in FIG. 11(B-1), when the first measurement scheme is selected, the connection destination changes from the hot spot cell directly to the small cell, whereas, when the second measurement scheme is selected, the connection destination changes from the hot spot cell to the macro cell, and further to the small cell as shown in FIG. 11(B-2). Thus, the first measurement scheme is more advantageous than the second measurement scheme.

In the case where a connection destination changes from the hot spot cell to the macro cell as shown in FIG. 11(C-1), when either of the first or second measurement schemes is selected, the connection destination changes from the hot spot cell directly to the macro cell in the same manner as shown in FIG. 11(C-2). Thus, the first and second measurement schemes have no preference for selection.

FIG. 12 is cases where the terminal 1 is present in a small cell. The cases of FIG. 12 include a case where a connection destination changes from the small cell to a different small cell as shown in FIG. 12(A-1), a case where a connection destination changes from the small cell to a hot spot cell as shown in FIG. 12(B-1), and a case where a connection destination changes from the small cell to a macro cell as shown in FIG. 12(C-1).

In the case where a connection destination changes from the small cell to the different small cell as shown in FIG. 12(A-1), when either of the first or second measurement schemes is selected, the connection destination changes from the small cell directly to the different small cell as shown in FIG. 12(A-2). Thus, the first and second measurement schemes have no preference for selection.

In the case where a connection destination changes from the small cell to the hot spot cell as shown in FIG. 12(B-1), in either case of the first and second measurement schemes, the connection destination changes from the small cell directly to the hot cell as shown in FIG. 12(B-2). However, when the first measurement scheme is selected, the measurement target cells include two cells (the hot spot cell and a different small cells), resulting in a longer time required to perform communication quality measurement, whereas, when the second measurement scheme is selected, the measurement targets cell is one cell (the hot spot cell), resulting in a short time to perform communication quality measurement. Thus, the second measurement scheme is more advantageous than the first measurement scheme.

In the case where a connection destination changes from a small cell to the macro cell as shown in FIG. 12(C-1), when either of the first or second measurement schemes is selected, the connection destination changes from the small cell directly to the macro cell in the same manner as shown in FIG. 12(C-2). Thus, the first and second measurement schemes have no preference for selection.

FIG. 13 is cases where the terminal 1 is present in a macro cell. The cases of FIG. 13 include a case where a connection destination changes from the macro cell to a different macro cell as shown in FIG. 13(A-1), a case where a connection destination changes from the macro cell to a hot spot cell as shown in FIG. 13(B-1), and a case where a connection destination changes from the macro cell to a small cell as shown in FIG. 13(C-1).

In the case where a connection destination changes from the macro cell to the different macro cell as shown in FIG. 13(A-1), when either of the first or second measurement schemes is selected, the connection destination changes from the marco cell directly to the different macro cell as shown in FIG. 13(A-2). Thus, the first and second measurement schemes have no preference for selection.

In the case where a connection destination changes from the macro cell to the hot spot cell as shown in FIG. 13(B-1), when the first measurement scheme is selected, the measurement target cells include two cells as shown in FIG. 13(B-2), resulting in a longer time required to perform communication quality measurement, whereas, when the second measurement scheme is selected, the measurement targets cell is one cell, resulting in a short time to perform communication quality measurement. Thus, the second measurement scheme is more advantageous than the first measurement scheme.

In the case where a connection destination changes from the macro cell to the small cell as shown in FIG. 13(C-1), when the first measurement scheme is selected, the measurement target cells include two cells as shown in FIG. 13(C-2), resulting in a longer time required to perform communication quality measurement, whereas, when the second measurement scheme is selected, the measurement targets cell is one cell, resulting in a short time to perform communication quality measurement. Thus, the second measurement scheme is more advantageous than the first measurement scheme.

As described above, there are combinations of a current cell and a destination cell where the first measurement scheme is more advantageous, the second measurement scheme is more advantageous, and the first and second measurement schemes have no preference for selection, and all these cases in matrix are shown in FIG. 14.

When the terminal 1 is present in a hot spot cell, the first measurement scheme is more advantageous or has no preference compared to the second measurement scheme. When the terminal 1 is present in a small cell or a macro cell, the second measurement scheme is more advantageous or has no preference compared to the second measurement scheme.

With regard to the difference between the current cell and the destination cell in their amounts of available bandwidth, when a destination cell has a larger amount of available bandwidth than the current cell, the second measurement scheme is more advantageous compared to the first second measurement scheme, whereas, when a destination cell has a smaller amount of available bandwidth than the current cell, the first measurement scheme more advantageous or has no preference compared to the second measurement scheme. When a destination cell and the current cell have the same amount of available bandwidth, the first and second measurement schemes have no preference for selection.

Accordingly, when the terminal is likely to move to a destination cell providing a larger amount of available bandwidth than the current cell, the second measurement scheme is preferably adopted, whereas, when the terminal is not likely to move to a destination cell providing a larger amount of available bandwidth than the current cell, the first measurement scheme is preferably adopted.

The possibility that the terminal 1 move to a destination cell providing a larger amount of available bandwidth than the current cell can be determined based on whether or not a cell providing a larger amount of available bandwidth (wider bandwidth cell) is present near the current cell. Thus, if a wider bandwidth cell is present near the terminal 1, the second measurement scheme is preferably selected, and otherwise the first measurement scheme is preferably selected.

Thus, in the present embodiment, when the terminal 1 is located in a hot spot cell, the first measurement scheme is selected, and when the terminal 1 is located in a macro cell, the second measurement scheme is selected. When the terminal 1 is located in a small cell, the terminal 1 determines whether or not there is a hot spot cell near the terminal 1, and if such a hot spot cell exists near the terminal 1, the measurement scheme selector 22 selects the second measurement scheme, and otherwise selects the first measurement scheme.

The terminal 1 determines whether or not there is a wide bandwidth cell near the terminal 1 by using historical communication information recorded in the historical database. The historical database stores past connected cells (cells to which the terminal 1 was connected in the past) at respective locations and corresponding wireless communication schemes used for communication with the past connected cells, the terminal can, based on these sets of information, determine whether or not there is a wide bandwidth cell (a cell providing a large amount of available bandwidth) near the current location of the terminal 1.

Specifically, as shown in FIG. 15, the measurement scheme selector 22 first determines in which type of cell the terminal 1 is located, a macro cell, a small cell, or a hot spot cell (ST111).

When terminal 1 is currently present in a hot spot cell (hot spot cell in ST111), the measurement scheme selector 22 selects the first measurement scheme (ST102). When the terminal 1 is currently present in a macro cell (macro cell in ST111), the measurement scheme selector 22 selects the second measurement scheme (ST103).

When the terminal 1 is currently present in a small cell (small cell in ST111), the terminal acquires the current location of the terminal 1 from the location information acquisition device 12 (ST112). Next, the terminal 1 acquires historical communication information on locations near the current location of the terminal 1 recorded in the historical database in the information storage 14. Specifically, the terminal 1 acquires past connected cells (cells to which the terminal 1 was connected in the past) at respective locations near the current location of the terminal 1 and corresponding wireless communication schemes used for communication with the past connected cells (ST113). Then, the terminal determines whether or not there is a wide bandwidth cell, i.e. a cell providing a larger amount of available bandwidth than the current cell (cell in which the terminal 1 is currently present) near the current location of the terminal 1 (ST114).

When there is no wide bandwidth cell (that is, when there is only a macro cell or a small cell) near the current location of the terminal 1 (No in ST114), the measurement scheme selector 22 selects the first measurement scheme (ST102). When a wide bandwidth cell exists near the current location of the terminal 1 (Yes in ST114), the measurement scheme selector 22 selects the second measurement scheme (ST103).

In some embodiments, even when a wide bandwidth cell exists near the current location of the terminal 1, if the wide bandwidth cell is located in a direction that is significantly different from the direction in which the terminal is moving and the terminal is obviously not likely to move into the wide bandwidth cell, the measurement scheme selector 22 may select the measurement scheme in consideration of the direction in which the terminal is moving. Specifically, the terminal may be configured such that, when a wide bandwidth cell is present near the terminal 1 and located in the direction in which the terminal is moving, measurement scheme selector selects the second measurement scheme, whereas, when a wide bandwidth cell is not present in the direction in which the terminal is moving, measurement scheme selector selects the first measurement scheme.

Third Embodiment

Figure 16:
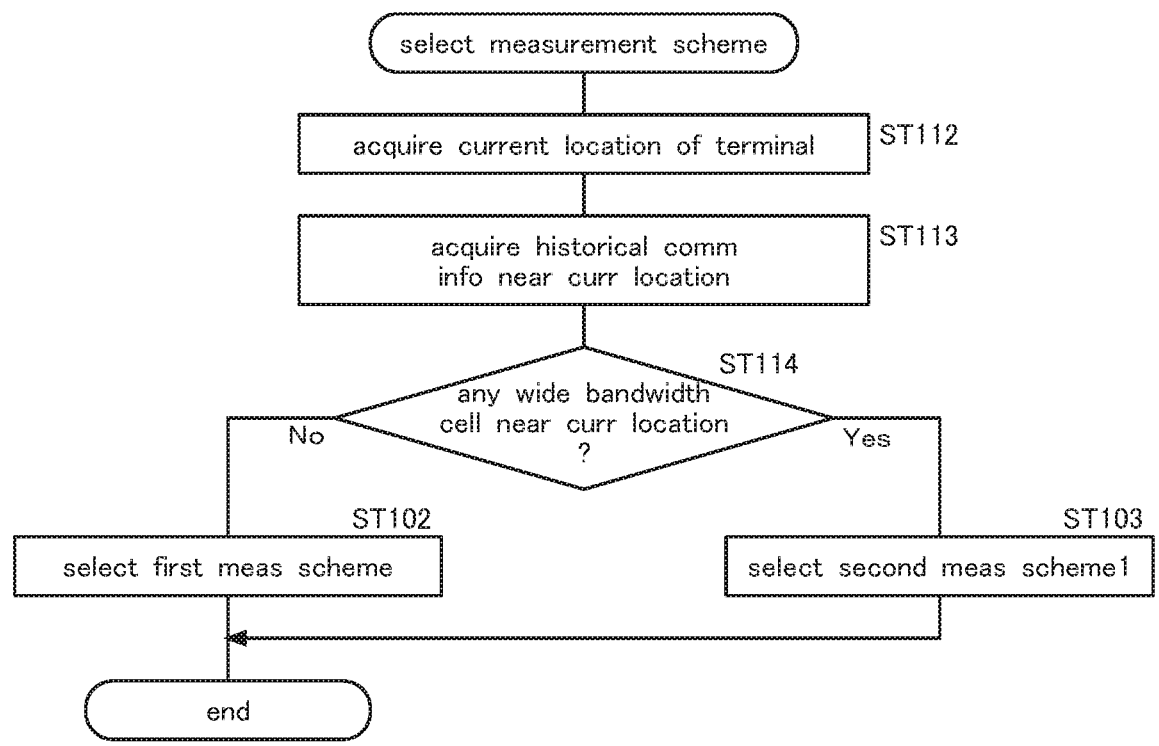
FIG. 16 is a flowchart showing a processing operation procedure of a measurement scheme selector 22 according to a third embodiment of the present invention.

Next, a third embodiment of the present invention will be described. Except for what will be discussed here, this embodiment is the same as the above-described embodiments. FIG. 16 is a flowchart showing a processing operation procedure of a measurement scheme selector 22 according to a third embodiment of the present invention.

In this embodiment, which does not involve the determination of the type of cell (different types of cells providing different amounts of available bandwidth) in which the terminal 1 is located as in the second embodiment (see FIG. 15), the measurement scheme selector 22 determines selects a measurement scheme based solely on the determination of whether or not a wide bandwidth cell is present based on historical communication information and location information.

Specifically, as shown in FIG. 16, the measurement scheme selector 22 first acquires the current location of the terminal 1 from the location information acquisition device 12 (ST112). Next, the terminal 1 acquires historical communication information on locations near the current location of the terminal 1 recorded in the historical database in the information storage 14. Specifically, the terminal 1 acquires past connected cells (cells to which the terminal 1 was connected in the past) at respective locations near the current location of the terminal 1 and corresponding wireless communication schemes used for communication with the past connected cells (ST113). Then, the measurement scheme selector 22 determines whether or not there is a wide bandwidth cell, i.e. a cell providing a larger amount of available bandwidth than the current cell near the current location of the terminal 1 (ST114).

When there is no wide bandwidth cell (that is, when there is only a macro cell or a small cell) near the current location of the terminal 1 (No in ST114), the measurement scheme selector 22 selects the first measurement scheme (ST102). When a wide bandwidth cell exists near the current location of the terminal 1 (Yes in ST114), the measurement scheme selector 22 selects the second measurement scheme (ST103).

Fourth Embodiment

Figure 17:
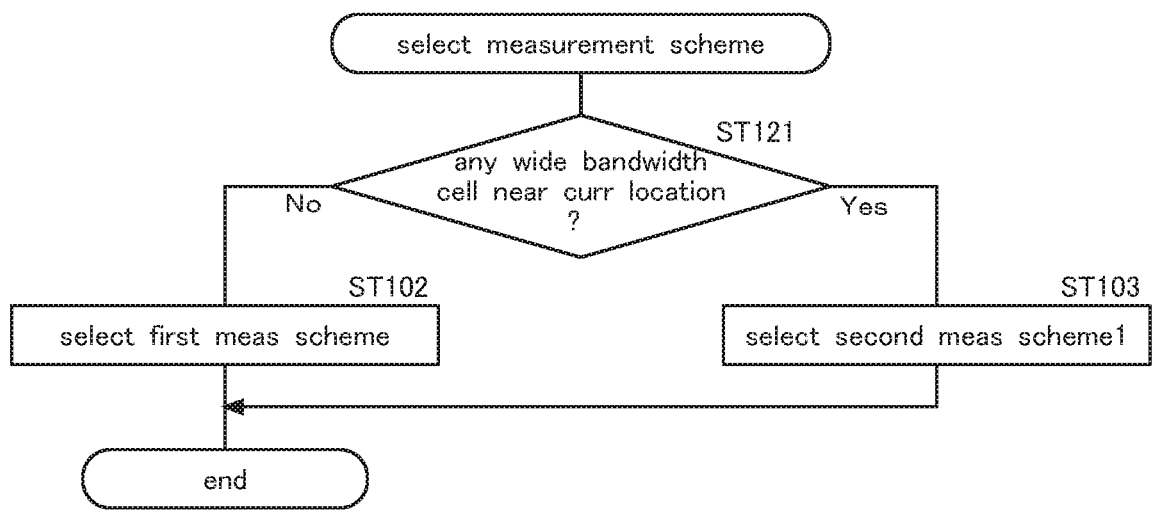
FIG. 17 is a flowchart showing a processing operation procedure of a measurement scheme selector 22 according to a fourth embodiment of the present invention.

Next, a fourth embodiment of the present invention will be described. Except for what will be discussed here, this embodiment is the same as the above-described embodiments. FIG. 17 is a flowchart showing a processing operation procedure of a measurement scheme selector 22 according to a fourth embodiment of the present invention.

The terminal 1 is notified of peripheral cells (connection destination candidates of the terminal 1) by a measurement control (Measurement Control) message (notification information) transmitted from a macro cell base station 2, and if the peripheral cells include a wide bandwidth cell, i.e. a cell providing a larger amount of available bandwidth than the current cell (cell in which the terminal 1 is currently present), the terminal is more likely to be connected to the wide bandwidth cell. Thus, in the present embodiment, the measurement scheme selector selects a measurement scheme based on the determination of whether or not the peripheral cells include a wide bandwidth cell.

Specifically, as shown in FIG. 17, the measurement scheme selector 22 first determines whether or not peripheral cells include a wide bandwidth cell, i.e. a cell providing a larger amount of available bandwidth than the current cell, where the peripheral cells are notified by a measurement control message (Measurement Control) transmitted from the macro cell base station 2 (ST121).

When the peripheral cells include no wide bandwidth cell (No in ST121), the measurement scheme selector 22 selects the first measurement scheme (ST102). When the peripheral cells include a wide bandwidth cell (Yes in ST121), the measurement scheme selector 22 selects the second measurement scheme (ST103).

Fifth Embodiment

Figure 18:
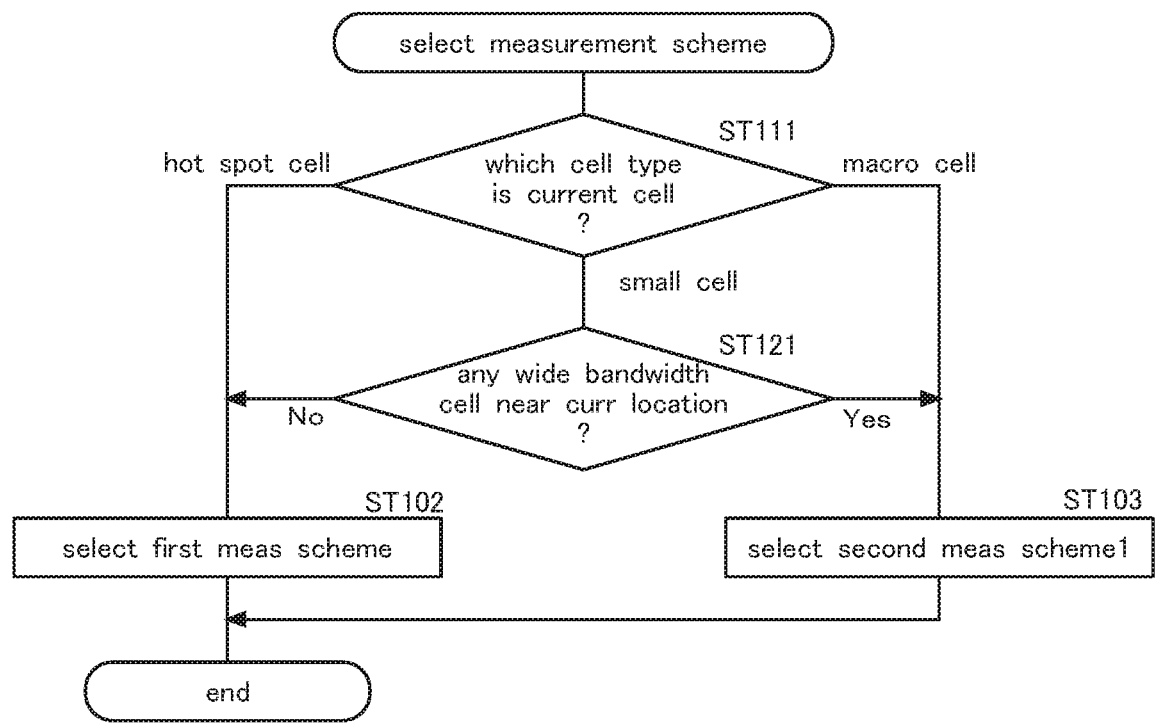
FIG. 18 is a flowchart showing a processing operation procedure of a measurement scheme selector 22 according to a fifth embodiment of the present invention.

Next, a fifth embodiment of the present invention will be described. Except for what will be discussed here, this embodiment is the same as the above-described embodiments. FIG. 18 is a flowchart showing a processing operation procedure of a measurement scheme selector 22 according to a fifth embodiment of the present invention.

In this embodiment, the measurement scheme selector 22 selects a measurement scheme based on the combination of the determination of whether or not in which type of cell (different types of cells providing different amounts of available bandwidth) the terminal 1 is located and the determination of whether or not peripheral cells notified by a macro cell base station include a wide bandwidth cell.

Specifically, as shown in FIG. 18, the measurement scheme selector 22 first determines in which type of cell the terminal 1 is located, a macro cell, a small cell, or a hot spot cell (ST111).

When terminal 1 is currently present in a hot spot cell (hot spot cell in ST111), the measurement scheme selector 22 selects the first measurement scheme (ST102). When the terminal 1 is currently present in a macro cell (macro cell in ST111), the measurement scheme selector 22 selects the second measurement scheme (ST103).

When the terminal 1 is currently present in a small cell (small cell in ST111), then the measurement scheme selector 22 determines whether or not peripheral cells include a wide bandwidth cell, i.e. a cell providing a larger amount of available bandwidth than the current cell, where the peripheral cells are notified by a measurement control (Measurement Control) message transmitted from the macro cell base station 2 (ST121).

When the peripheral cells include no wide bandwidth cell (No in ST121), the measurement scheme selector 22 selects the first measurement scheme (ST102). When the peripheral cells include a wide bandwidth cell (Yes in ST121), the measurement scheme selector 22 selects the second measurement scheme (ST103).

Sixth Embodiment

Next, a sixth embodiment of the present invention will be described. Except for what will be discussed here, this embodiment is the same as the above-described embodiments. FIG. 19 is a flowchart showing a processing operation procedure of a measurement scheme selector 22 according to a sixth embodiment of the present invention.

In this embodiment, the measurement scheme selector 22 selects a measurement scheme based on the combination of the determination of whether or not in which type of cell (different types of cells providing different amounts of available bandwidth) the terminal 1 is located, the determination of whether or not peripheral cells notified by a macro cell base station 2 include a wide bandwidth cell, and the determination of whether or not a wide bandwidth cell is present based on historical communication information and location information.

The peripheral cells notified by a macro cell base station 2 may include a cell which is located remote from the terminal land thus is not detectable at the terminal 1. Such an undetectable cell is not suitable for a connection destination of the terminal 1 even if the cell is a wide bandwidth cell. Thus, a technical significance is provided by the configuration in which the measurement scheme selector 22 selects a measurement scheme based on the combination of the determination of whether or not peripheral cells include a wide bandwidth cell and the determination of whether or not a wide bandwidth cell is present based on historical communication information and location information.

Since the determination of whether or not a wide bandwidth cell is present based on historical communication information and location information is more complicated than the determination of whether or not peripheral cells include a wide bandwidth cell, the former determination is carried out after the latter determination is completed.

Specifically, as shown in FIG. 19, the measurement scheme selector 22 first determines in which type of cell the terminal 1 is located, a macro cell, a small cell, or a hot spot cell (ST111).

When terminal 1 is currently present in a hot spot cell (hot spot cell in ST111), the measurement scheme selector 22 selects the first measurement scheme (ST102). When the terminal 1 is currently present in a macro cell (macro cell in ST111), the measurement scheme selector 22 selects the second measurement scheme (ST103).

When the terminal 1 is currently present in a small cell (small cell in ST111), then the measurement scheme selector 22 determines whether or not peripheral cells include a wide bandwidth cell, i.e. a cell providing a larger amount of available bandwidth than the current cell, where the peripheral cells are notified by a measurement control (Measurement Control) message transmitted from the macro cell base station 2 (ST121).

When the peripheral cells include no wide bandwidth cell (No in ST121), the measurement scheme selector 22 selects the first measurement scheme (ST102).

When the peripheral cells include a wide bandwidth cell (Yes in ST121), the measurement scheme selector 22 acquires the current location of the terminal 1 from the location information acquisition device 12 (ST112). Next, the terminal 1 acquires historical communication information on locations near the current location of the terminal 1 recorded in the historical database in the information storage 14. Specifically, the terminal 1 acquires past connected cells (cells to which the terminal 1 was connected in the past) at respective locations near the current location of the terminal 1 and corresponding wireless communication schemes used for communication with the past connected cells (ST113). Then, the terminal 1 determines whether or not there is a wide bandwidth cell, i.e. a cell providing a larger amount of available bandwidth than the current cell near the current location of the terminal 1 (ST114).

When there is no wide bandwidth cell (that is, when there is only a macro cell or a small cell) near the current location of the terminal 1 (No in ST114), the measurement scheme selector 22 selects the first measurement scheme (ST102). When a wide bandwidth cell exists near the current location of the terminal 1 (Yes in ST114), the measurement scheme selector 22 selects the second measurement scheme (ST103).

While specific embodiments of the present invention are described herein for illustrative purposes, the present invention is not limited thereto. It will be understood that various changes, substitutions, additions, and omissions may be made for elements of the embodiments without departing from the scope of the invention. In addition, elements and features of the different embodiments may be combined with each other as appropriate to yield an embodiment which is within the scope of the present invention.

For example, in the above described embodiments, bandwidths provided by the current cell, provided by a cell included in the peripheral cells, and provided by a nearby cell determined based on location information and historical communication information are used as determination criteria, and a communication scheme is selected based on a combination of a set of the determination criteria selected as appropriate from the three determination criteria. However, a combination of criteria not disclosed in these embodiments may be used as a basis for selecting a communication quality measurement scheme. For example, a set of two criteria; that is, bandwidths provided by a nearly cell notified from a base station handling control plane messages and provided by a nearby cell determined based on location information and historical communication information may be used as a set of determination criteria to select a communication quality measurement scheme.

In the above described embodiments, when using the second measurement scheme, a scope of targets of communication quality measurement is narrowed down to one cell. However, the targets of communication quality measurement may be narrowed down to multiple cells. Even in such configurations, narrowing down a scope of targets of communication quality measurement effectively shorten a time required to perform a measurement operation.

Furthermore, configurations in the above described embodiments include three types of cells comprised of a macro cell, a small cell and a hot spot cell, which means that there are cells providing three different amounts of available bandwidth. However, in case of four or more types of cells providing different amounts of available bandwidth, the same control procedure as used in the above described configurations may be effectively utilized.

INDUSTRIAL APPLICABILITY

A terminal device, a communication system and a communication quality measurement method according to the present invention achieve an effect of shortening a time required to perform the communication quality measurement by properly narrowing down a scope of targets of communication quality measurement, and are useful as a terminal device, a communication system, and a communication quality measurement method for measuring quality levels of communication with peripheral cells notified by a communication control device and reporting measurement results to the communication control device.

GLOSSARY

1 terminal
2 macro cell base station (communication control device)
3 small cell base station
4 hot spot cell base station
11 communication device
12 location information acquisition device
13 controller
14 information storage
21 communication controller
22 measurement scheme selector
23 measurement target extractor
24 communication quality measurer
25 historical data recorder

The invention claimed is:

1. A terminal device configured to measure communication quality levels of communication with peripheral cells notified by a communication control device, and report measurement results to the communication control device, the terminal device comprising:
- a communication device configured to communicate with the communication control device;
- a location information acquisition device configured to acquire current location information indicating a current location of the terminal device;
- an information storage configured to accumulate historical communication information on past communication status at respective locations; and
- a controller configured to, upon receiving information on the peripheral cells from the communication control device, measure communication quality levels of communication with the peripheral cells, and transmit measurement results to the communication control device;
- wherein the controller is configured such that, after determining a current cell in which the terminal device is currently present, when the current cell is a cell providing a largest amount of available bandwidth, the controller selects a first measurement scheme, whereas, when the current cell is a cell providing a smallest amount of available bandwidth, the controller selects a second measurement scheme, and
- wherein, when the controller selects the first measurement scheme, the controller measures communication quality levels of communication with all the notified peripheral cells, whereas, when the controller selects the second measurement scheme, after the location information acquisition device acquires the current location information, and then, based on the current location information and the historical communication information, the controller extracts one or more of the notified peripheral cells and measures communication quality levels of communication with the extracted one or more peripheral cells.

2. A terminal device configured to measure communication quality levels of communication with peripheral cells notified by a communication control device, and report measurement results to the communication control device, the terminal device comprising:
- a communication device configured to communicate with the communication control device;
- a location information acquisition device configured to acquire current location information indicating a current location of the terminal device;
- an information storage configured to accumulate historical communication information on past communication status at respective locations; and
- a controller configured to, upon receiving information on the peripheral cells from the communication control device, measure communication quality levels of communication with the peripheral cells and transmit measurement results to the communication control device;
- wherein the controller is configured to, after determining a current cell, selects one of a first measurement scheme and a second measurement scheme based on information on at least one of an amount of available bandwidth provided by a current cell in which the terminal device is currently present, amounts of available bandwidth provided by the peripheral cells, and an amount of available bandwidth provided by a cell located near the terminal device, and
- wherein, when the controller selects the first measurement scheme, the controller measures communication quality levels of communication with all the notified peripheral cells, whereas, when the controller selects the second measurement scheme, the location information acquisition device acquires the current location information, and then, based on the current location information and the historical communication information, the controller extracts one or more of the notified peripheral cells and measures communication quality levels of communication with the extracted one or more peripheral cells.

3. The terminal device according to claim 2, wherein the controller acquires information on amounts of available bandwidth provided by cells located near the terminal device based on the current location information and the historical communication information.

4. The terminal device according to claim 2, wherein,
when the current cell is a cell providing a largest amount of available bandwidth, the controller selects the first measurement scheme, and
when the current cell is not the cell providing the largest amount of available bandwidth, the controller selects the second measurement scheme.

5. The terminal device according to claim 2, wherein,
when the current cell is a cell providing a largest amount of available bandwidth, the controller selects the first measurement scheme,
when the current cell is a cell providing a smallest amount of available bandwidth, the controller selects the second measurement scheme,
when the current cell is neither the cell providing the largest amount of available bandwidth nor the cell providing the smallest amount of available bandwidth, and no cell providing a larger amount of available bandwidth than the current cell is located near the current cell, the controller selects the first measurement scheme, and
when the current cell is neither the cell providing the largest amount of available bandwidth nor the cell providing the smallest amount of available bandwidth and a cell providing a larger amount of available bandwidth than the current cell is located near the current cell, the controller selects the second measurement scheme.

6. The terminal device according to claim 2, wherein,
when no cell providing a larger amount of available bandwidth than the current cell is located near the current cell, the controller selects the first measurement scheme, and
when a cell providing a larger amount of available bandwidth than current cell is located near the current cell, the controller selects the second measurement scheme.

7. The terminal device according to claim 2, wherein,
when the peripheral cells do not include any cell providing a larger amount of available bandwidth than the current cell, the controller selects the first measurement scheme, and
when the peripheral cells include a cell providing a larger amount of available bandwidth than the current cell, the controller selects the second measurement scheme.

8. The terminal device according to claim 2, wherein,
when the current cell is a cell providing a largest amount of available bandwidth, the controller selects the first measurement scheme,
when the current cell is a cell providing a smallest amount of available bandwidth, the controller selects the second measurement scheme,
when the current cell is neither the cell providing the largest amount of available bandwidth nor the cell providing the smallest amount of available bandwidth, and the peripheral cells do not include any cell providing a larger amount of available bandwidth than the current cell, the controller selects the first measurement scheme, and when the current cell is neither the cell providing the largest amount of available bandwidth nor the cell providing the smallest amount of available bandwidth, and the peripheral cells include a cell providing a larger amount of available bandwidth than the current cell, the controller selects the first measurement scheme.

9. The terminal device according to claim 2, wherein, when the current cell is a cell providing a largest amount of available bandwidth, the controller selects the first measurement scheme, when the current cell is a cell providing a smallest amount of available bandwidth, the controller selects the second measurement scheme, when the current cell is neither the cell providing the largest amount of available bandwidth nor the cell providing the smallest amount of available bandwidth, and the peripheral cells do not include any cell providing a larger amount of available bandwidth than the current cell, the controller selects the first measurement scheme, and when the current cell is neither the cell providing the largest amount of available bandwidth nor the cell providing the smallest amount of available bandwidth, and the peripheral cells include a cell providing a larger amount of available bandwidth than the current cell, the controller selects the first measurement scheme, and when a cell providing a larger amount of available bandwidth than the current cell is located near the current cell, the controller selects the second measurement scheme.

10. A communication system in which a communication control device notifies a terminal device of peripheral cells, and the terminal device, in turn, measures communication quality levels of communication with the peripheral cells, and reports measurement results to the communication control device, wherein the terminal device comprises:
a communication device configured to communicate with the communication control device;
a location information acquisition device configured to acquire current location information indicating a current location of the terminal device;
an information storage configured to accumulate historical communication information on past communication status at respective locations; and
a controller configured to, upon receiving information on the peripheral cells from the communication control device, measure communication quality levels of communication with the peripheral cells and transmit measurement results to the communication control device, and
wherein the controller is configured such that, after determining a current cell in which the terminal device is currently present, when the current cell is a cell providing a largest amount of available bandwidth, the controller selects a first measurement scheme, whereas, when the current cell is a cell providing a smallest amount of available bandwidth, the controller selects a second measurement scheme, and
wherein, when the controller selects the first measurement scheme, the controller measures communication quality levels of communication with all the notified peripheral cells, whereas, when the controller selects the second measurement scheme, after the location information acquisition device acquires the current location information, and then, based on the current location information and the historical communication information, the controller extracts one or more of the notified peripheral cells and measures communication quality levels of communication with the extracted one or more peripheral cells.

11. A communication system in which a communication control device notifies a terminal device of peripheral cells, and the terminal device, in turn, measures communication quality levels of communication with the peripheral cells and reports measurement results to the communication control device, wherein the terminal device comprises:
a communication device configured to communicate with the communication control device;
a location information acquisition device configured to acquire current location information indicating a current location of the terminal device;
an information storage configured to accumulate historical communication information on past communication status at respective locations; and
a controller configured to, upon receiving information on the peripheral cells from the communication control device, measure communication quality levels of communication with the peripheral cells, and transmit measurement results to the communication control device;
wherein the controller is configured to, after determining a current cell, selects one of a first measurement scheme and a second measurement scheme based on information on an amount of available bandwidth provided by a current cell in which the terminal device is currently present and/or an amount of available bandwidth provided by a cell located near the terminal device, and
wherein, when the controller selects the first measurement scheme, the controller measures communication quality levels of communication with all the notified peripheral cells, whereas, when the controller selects the second measurement scheme, the location information acquisition device acquires the current location information, and then, based on the current location information and the historical communication information, the controller extracts one or more of the notified peripheral cells and measures communication quality levels of communication with the extracted one or more peripheral cells.

12. A communication quality measurement method performed by a terminal device for measuring communication quality levels of communication with peripheral cells notified by a communication control device and reporting measurement results to the communication control device, the method comprising:

upon the terminal device receiving information on the peripheral cells, when a current cell in which the terminal device is present is a cell providing a largest amount of available bandwidth, the terminal device selecting a first measurement scheme, and when the current cell is a cell providing a smallest amount of available bandwidth, the terminal device selecting a second measurement scheme;

when the first measurement scheme is selected, the terminal device measuring communication quality levels of communication with all the peripheral cells, and when the second measurement scheme is selected, the terminal device acquiring current location information, and then, based on the current location information and historical communication information, which is information on past communication status at respective locations, the terminal device extracting one or more of the peripheral cells and measures communication quality levels of communication with the extracted one or more peripheral cells; and the terminal device transmitting the measurement results to the communication controller.

13. A communication quality measurement method performed by a terminal device for measuring communication quality levels of communication with peripheral cells notified by a communication control device and reporting measurement results to the communication control device, the method comprising:

upon the terminal device receiving information on the peripheral cells, the terminal device selecting a first measurement scheme and/or a second measurement scheme based on at least one of an amount of available bandwidth provided by a current cell in which the terminal device is currently present, amounts of available bandwidth provided by the peripheral cells, and an amount of available bandwidth provided by a cell located near the terminal device;

when the first measurement scheme is selected, the terminal device measuring the communication quality levels of communication with all the peripheral cells, and when the second measurement scheme is selected, the terminal device acquiring current location information indicating a current location of the terminal device, and then, based on the current location information and historical communication information on past communication status at respective locations, the terminal device extracting one or more of the peripheral cells and measures communication quality levels of communication with the extracted one or more peripheral cells; and the terminal device transmitting measurement results to the communication controller.

* * * * *